W. G. WHITE.
MECHANICAL CONTROLLER COMPOSING MACHINE.
APPLICATION FILED SEPT. 11, 1905.

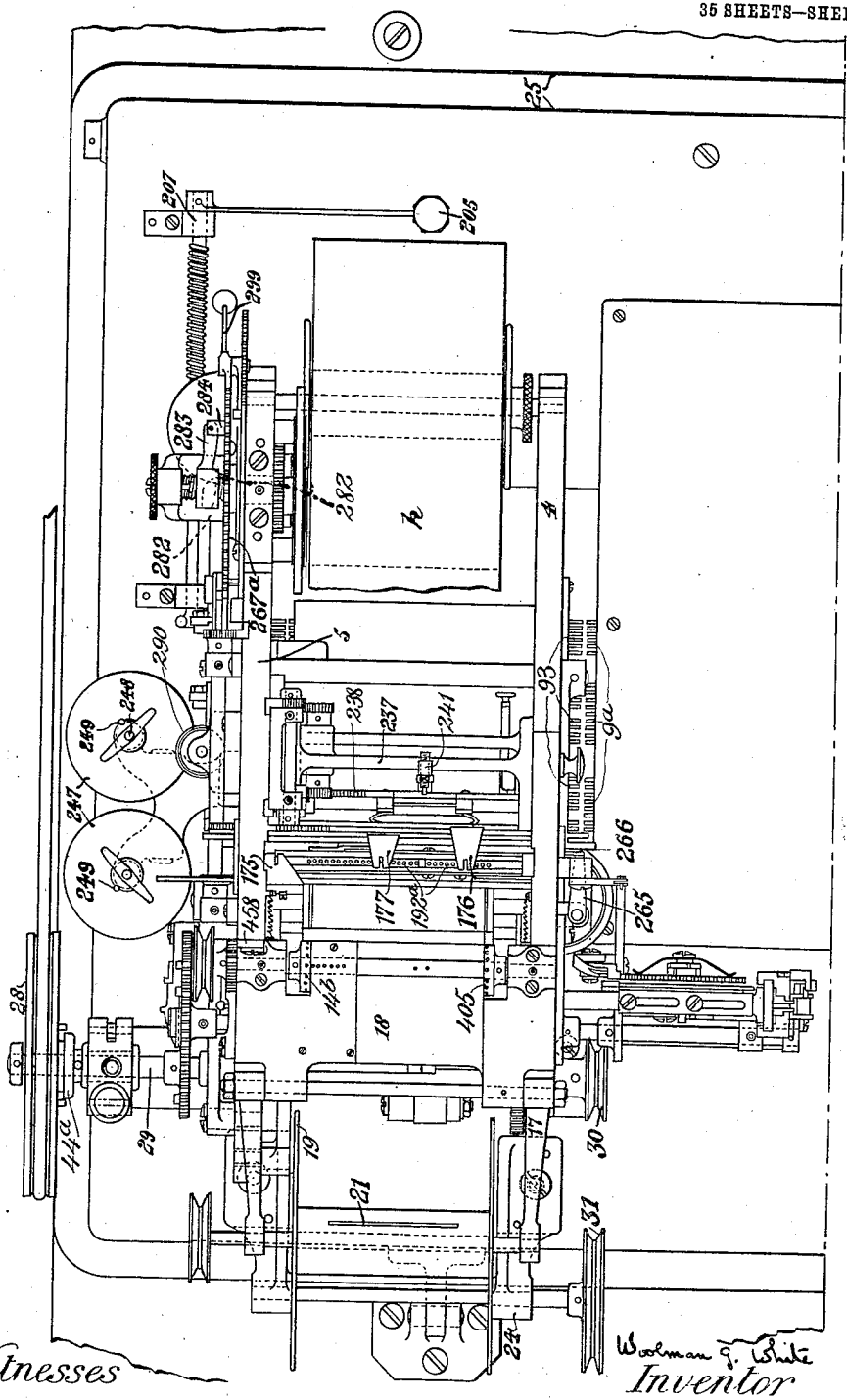

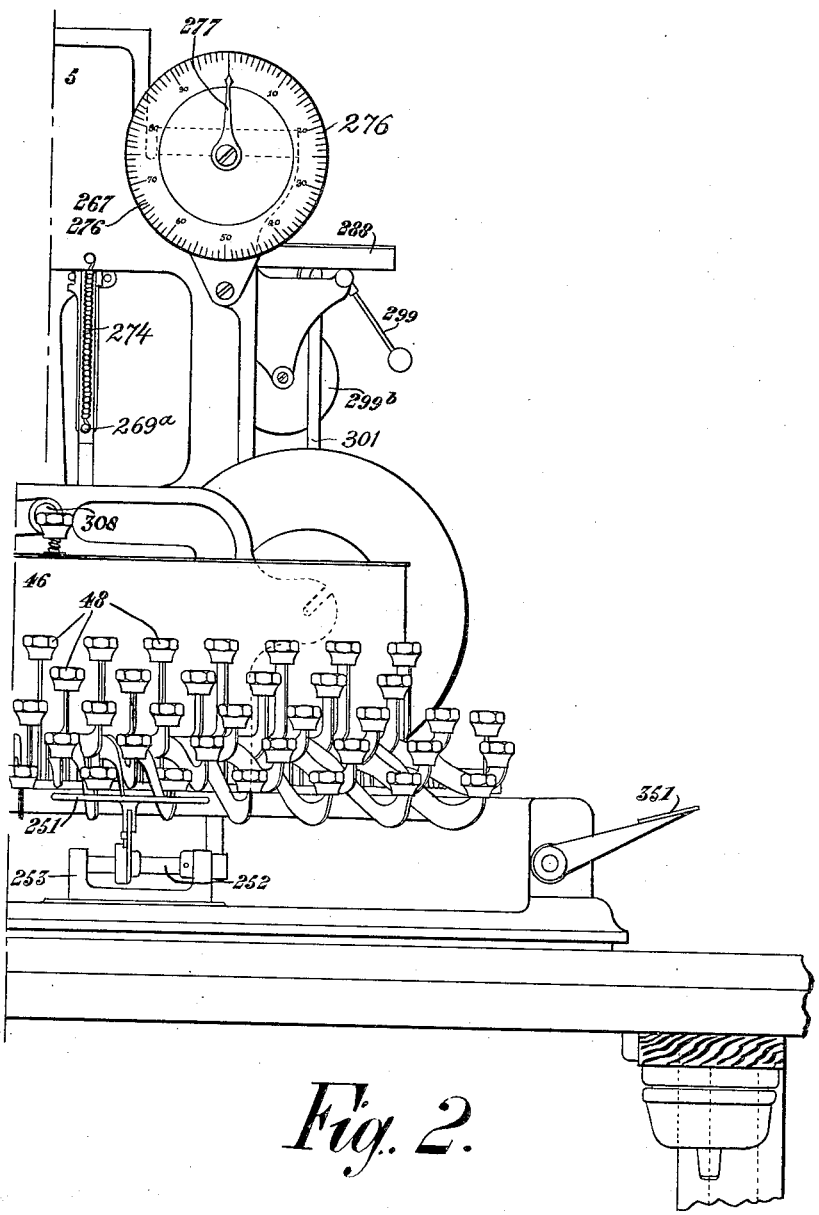

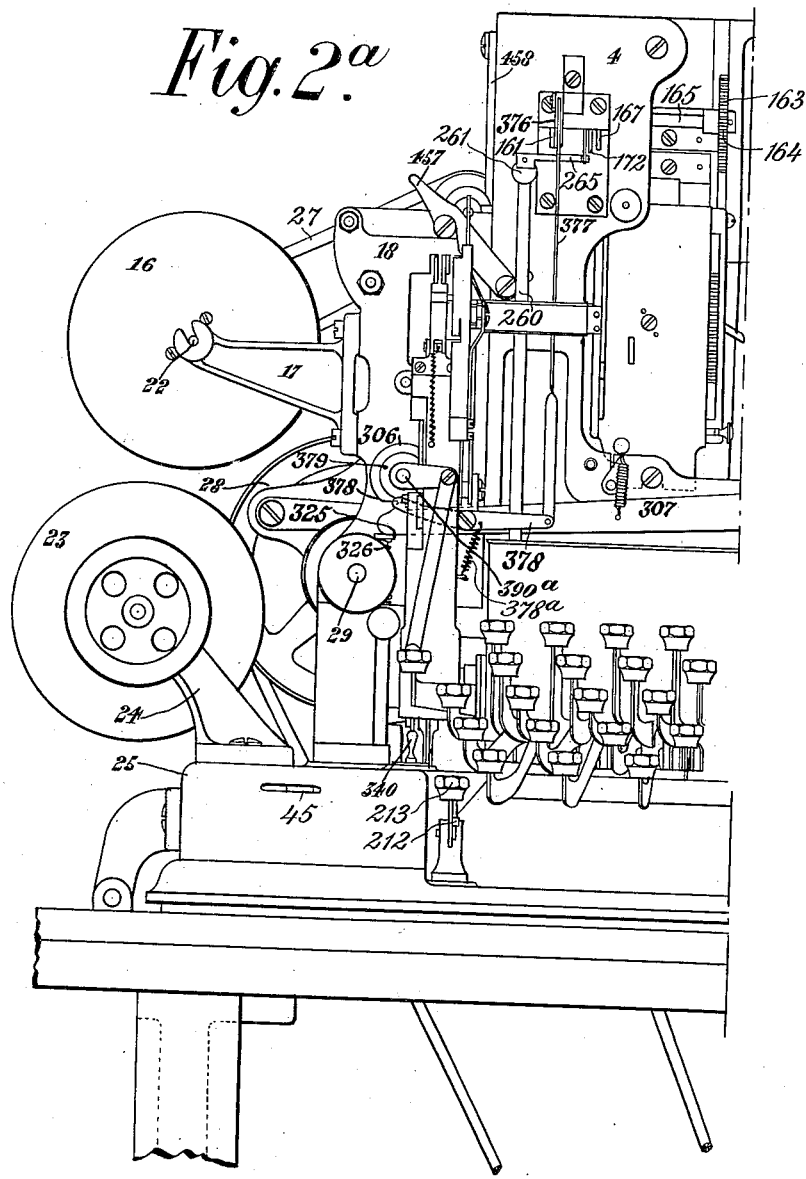

943,611.

Patented Dec. 14, 1909.
35 SHEETS—SHEET 5.

Witnesses

Inventor
per Chas. S. Woodroffe
Attorney

W. G. WHITE.
MECHANICAL CONTROLLER COMPOSING MACHINE.
APPLICATION FILED SEPT. 11, 1905.

943,611.

Patented Dec. 14, 1909.
35 SHEETS—SHEET 6.

Figure 4:
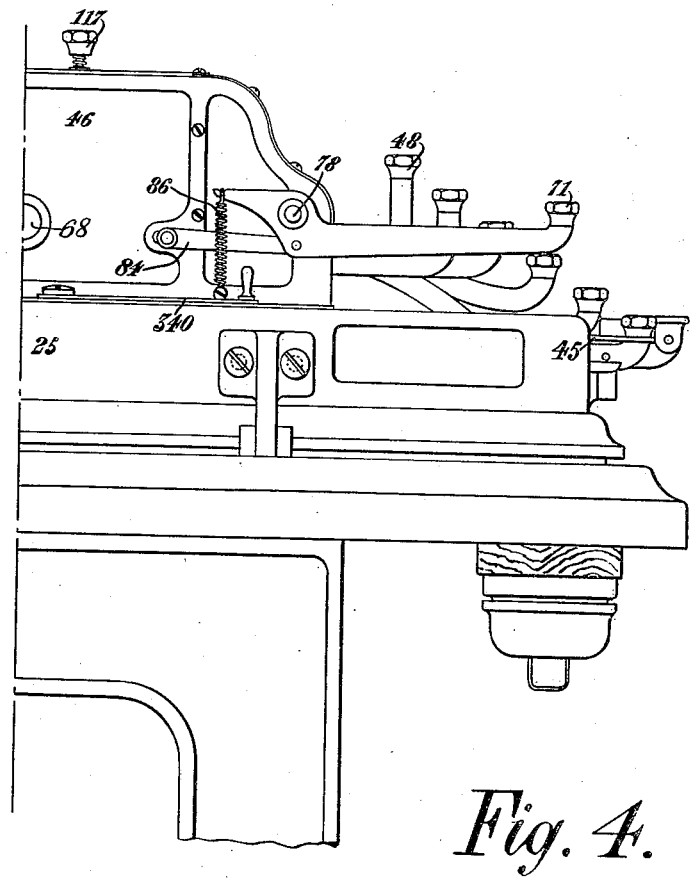

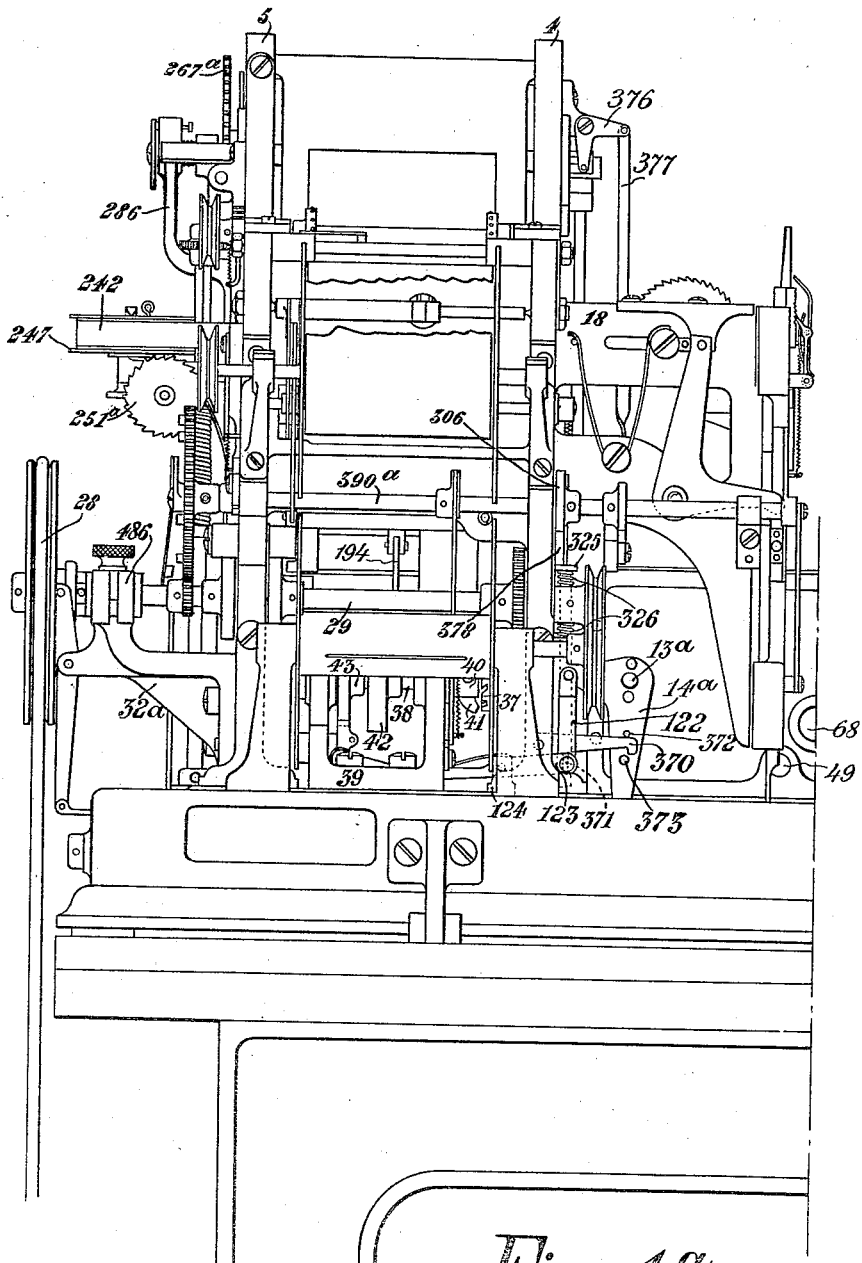
Fig. 4ª.

W. G. WHITE.
MECHANICAL CONTROLLER COMPOSING MACHINE.
APPLICATION FILED SEPT. 11, 1905.

943,611.

Patented Dec. 14, 1909.
35 SHEETS—SHEET 8.

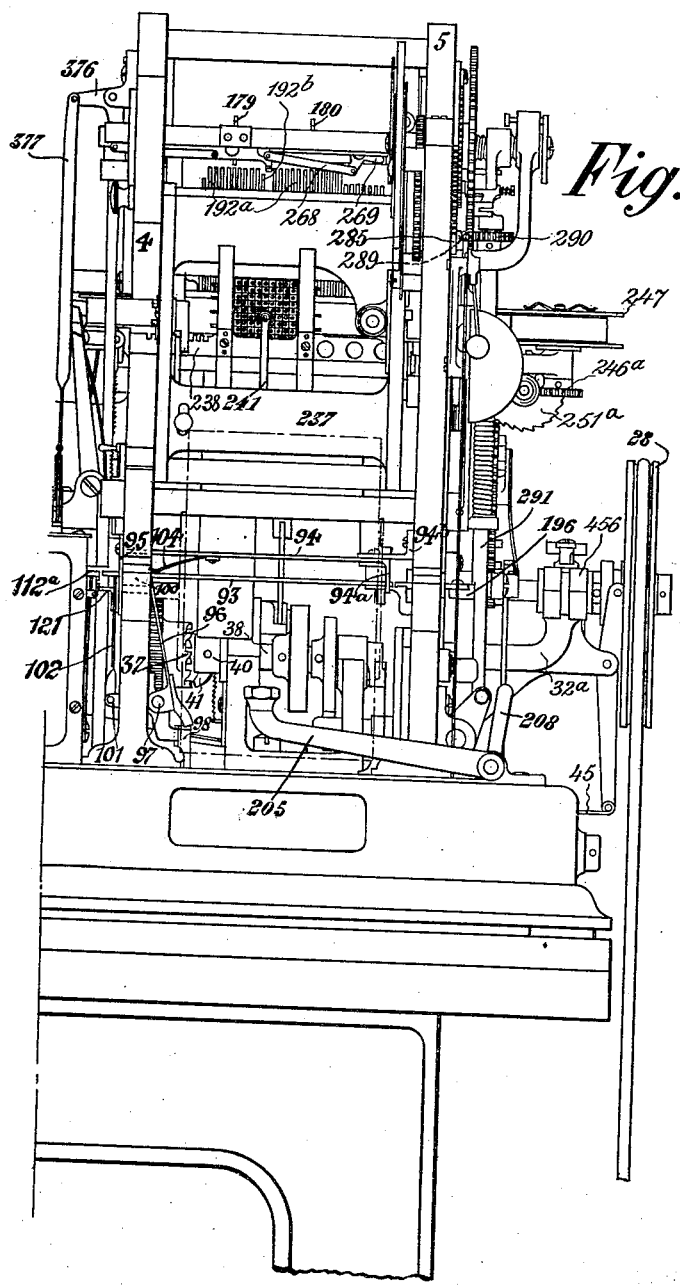

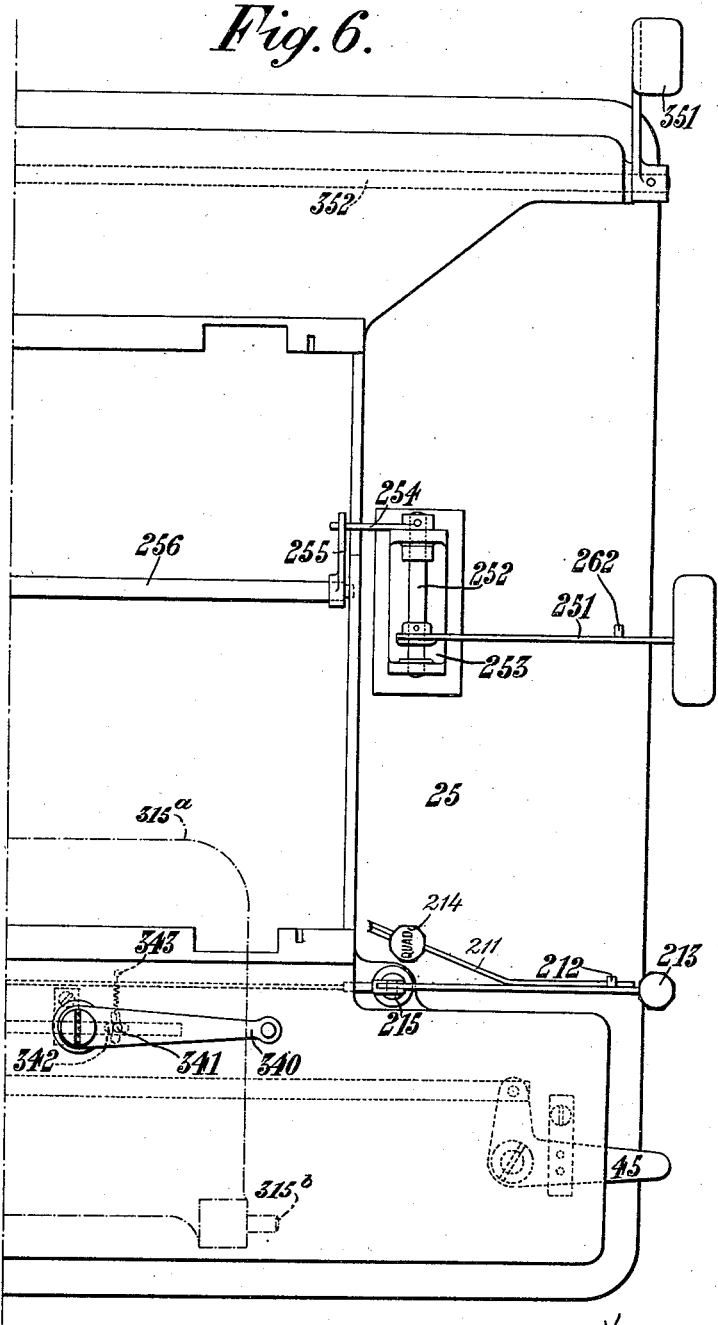

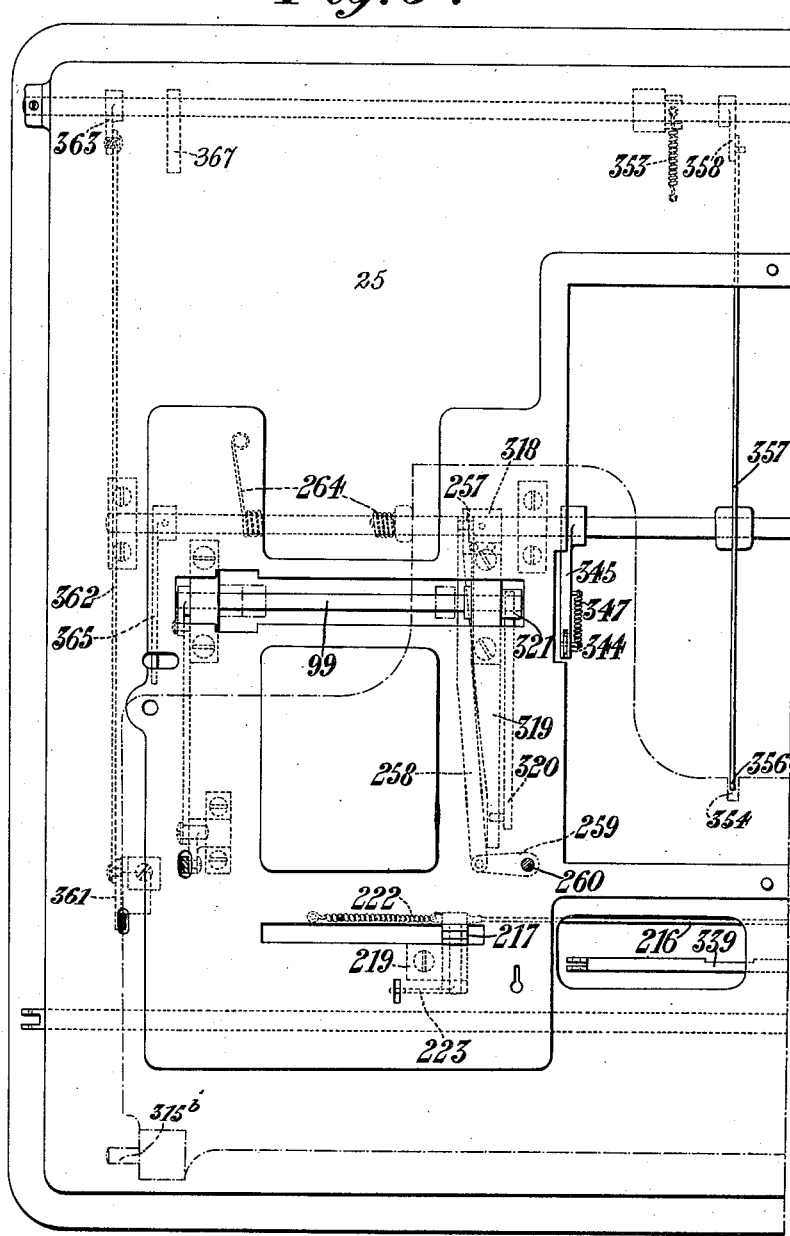

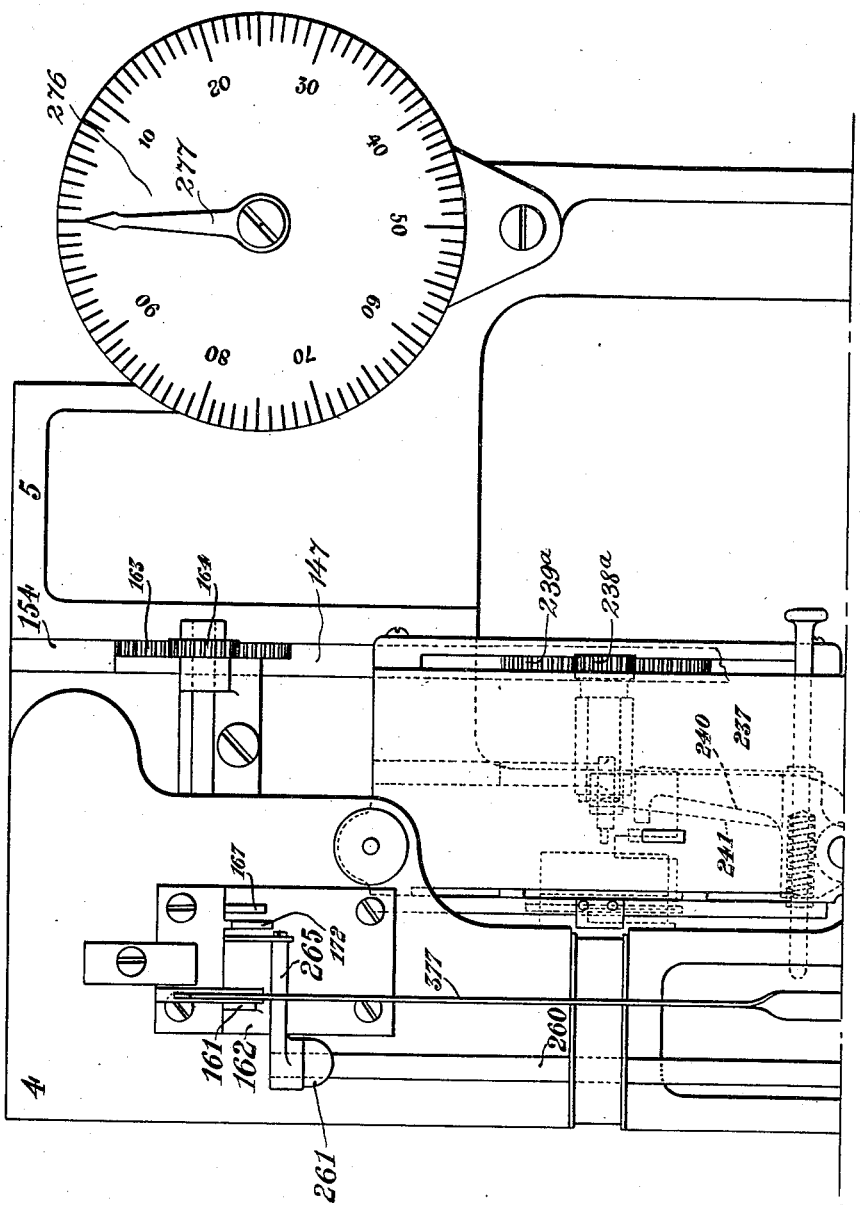

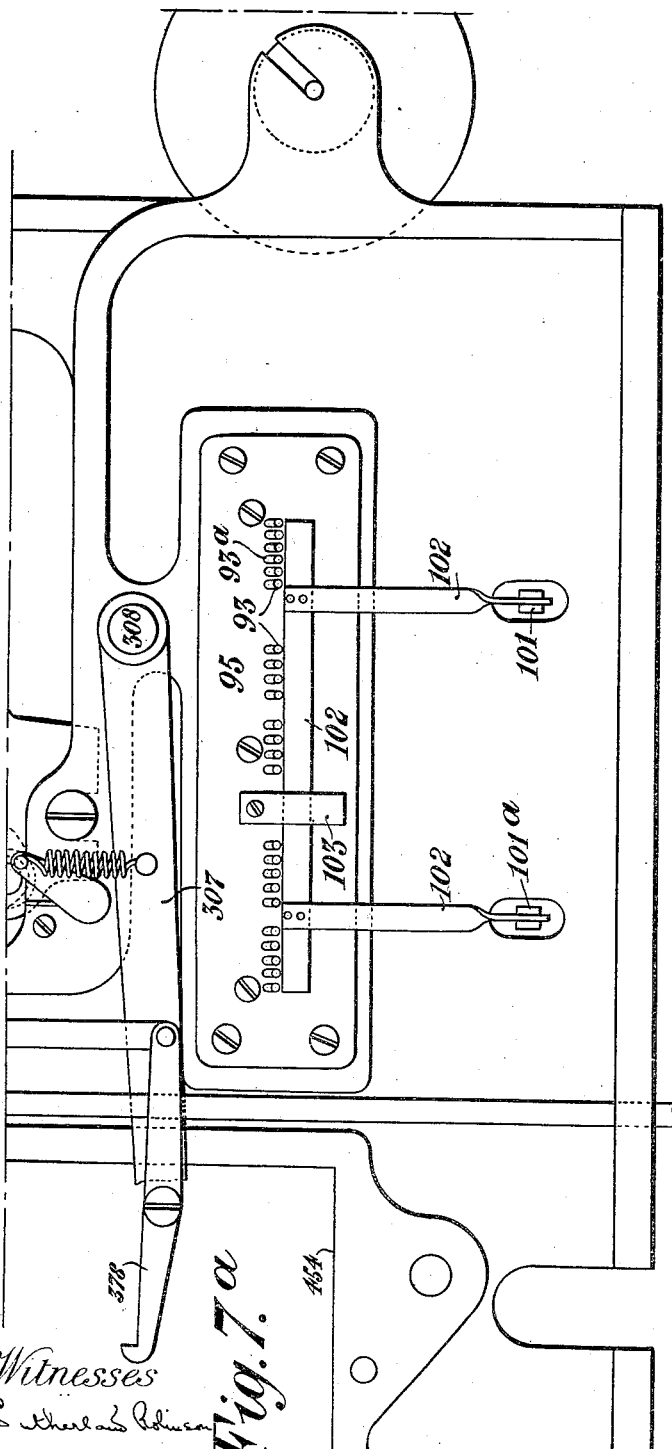

W. G. WHITE.
MECHANICAL CONTROLLER COMPOSING MACHINE.
APPLICATION FILED SEPT. 11, 1905.

943,611.

Patented Dec. 14, 1909.
35 SHEETS—SHEET 14.

Witnesses

Woolman G. White
Inventor per Chas S. Novaroffe
Attorney

W. G. WHITE.
MECHANICAL CONTROLLER COMPOSING MACHINE.
APPLICATION FILED SEPT. 11, 1905.

943,611.

Patented Dec. 14, 1909.
35 SHEETS—SHEET 15.

Witnesses
Inventor
Woolman G. White
per Chas S. Woodroffe
Attorney

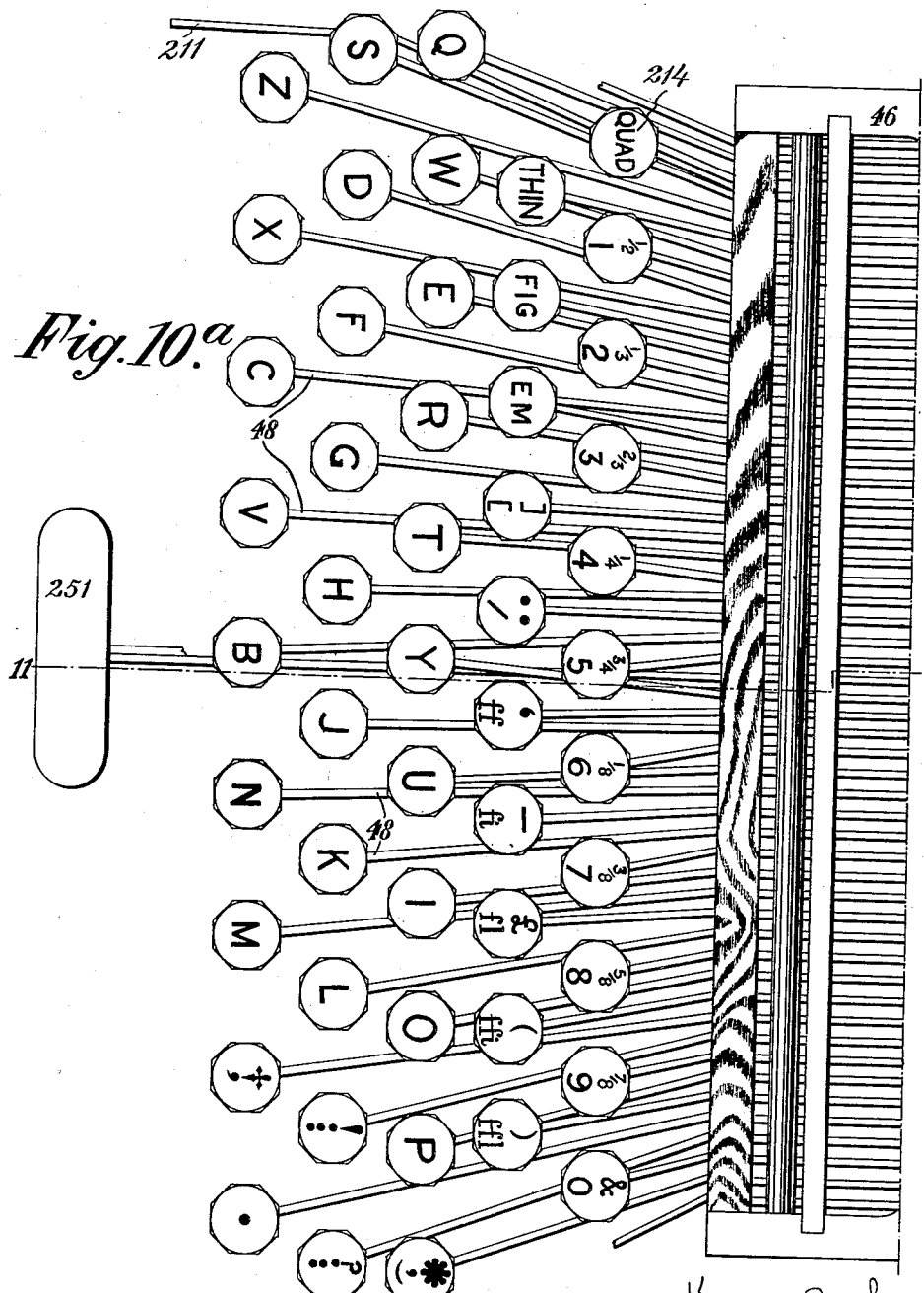

W. G. WHITE.
MECHANICAL CONTROLLER COMPOSING MACHINE.
APPLICATION FILED SEPT. 11, 1905.

943,611.

Patented Dec. 14, 1909.
35 SHEETS—SHEET 19.

Witnesses

Woolman G. White
Inventor per Chas S. Woodroffe
Attorney

W. G. WHITE.
MECHANICAL CONTROLLER COMPOSING MACHINE.
APPLICATION FILED SEPT. 11, 1905.
943,611.
Patented Dec. 14, 1909.
35 SHEETS—SHEET 20.
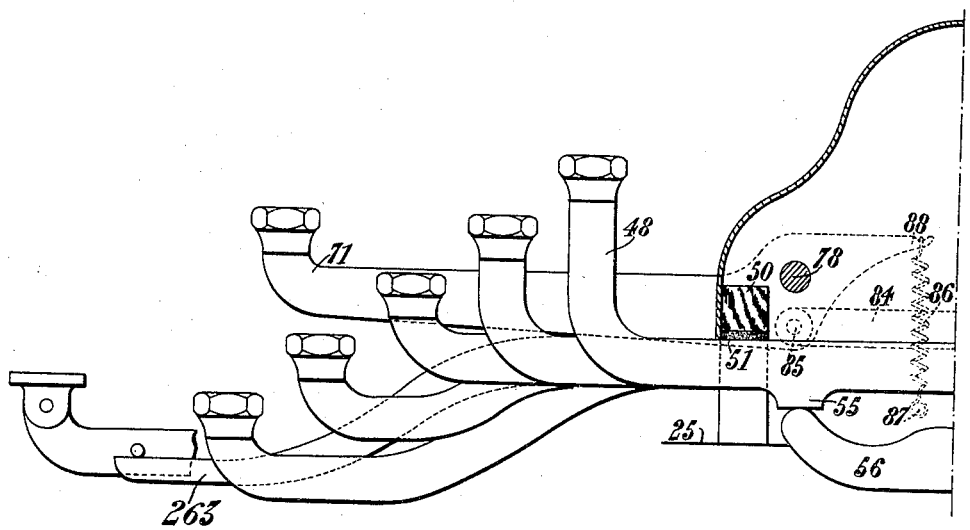
Fig. 11.ᵃ
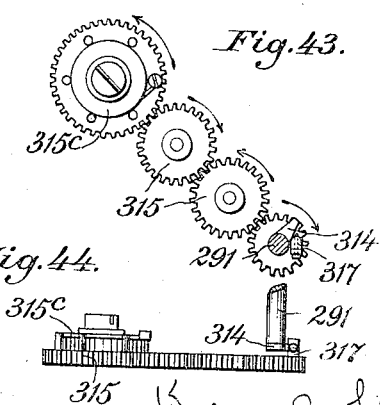
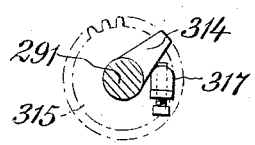
Witnesses
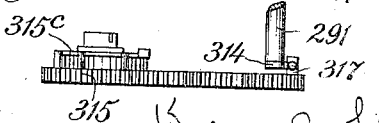
Inventor
per Chas S. Woodroffe
Attorney

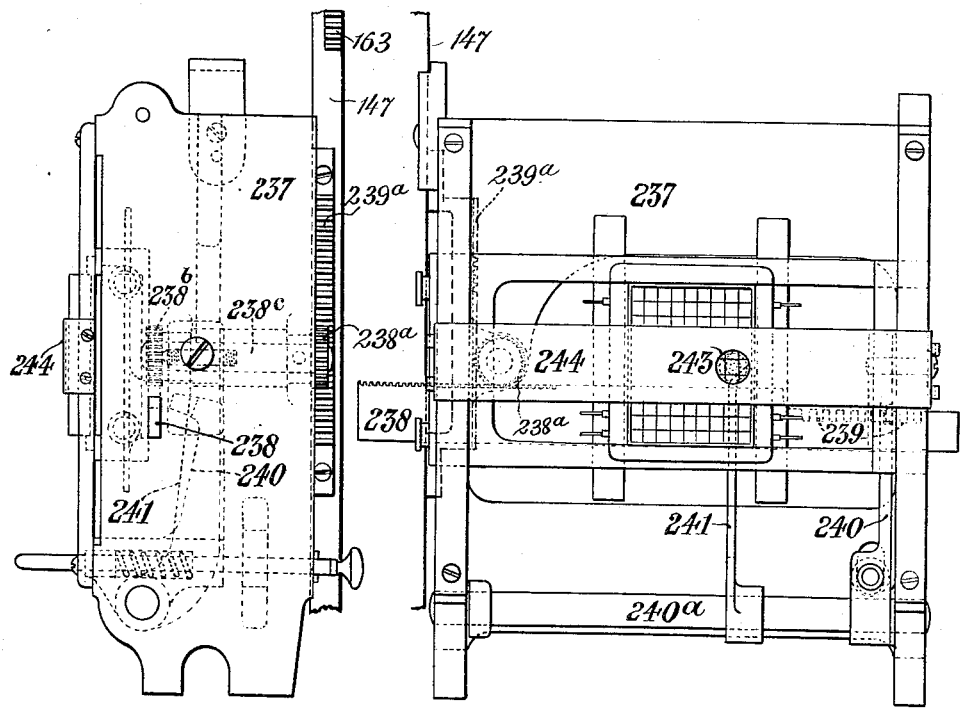
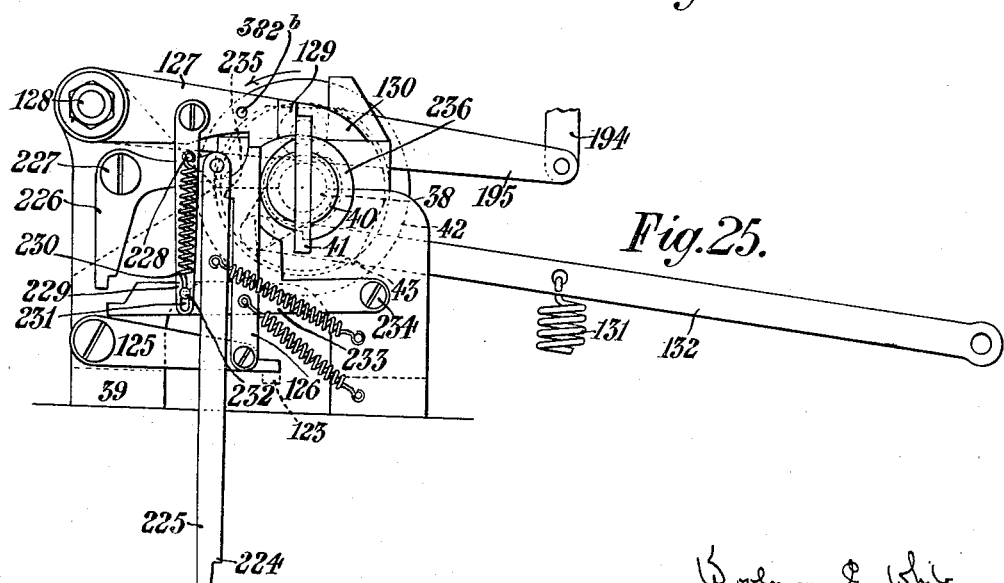

W. G. WHITE.
MECHANICAL CONTROLLER COMPOSING MACHINE.
APPLICATION FILED SEPT. 11, 1905.

943,611.

Patented Dec. 14, 1909.
35 SHEETS—SHEET 22.

Witnesses

Inventor per Chas. S. Woodroffe
Attorney

W. G. WHITE.
MECHANICAL CONTROLLER COMPOSING MACHINE.
APPLICATION FILED SEPT. 11, 1905.

943,611.

Patented Dec. 14, 1909.
35 SHEETS—SHEET 23.

W. G. WHITE.
MECHANICAL CONTROLLER COMPOSING MACHINE.
APPLICATION FILED SEPT. 11, 1905.
943,611.
Patented Dec. 14, 1909.
35 SHEETS—SHEET 24.
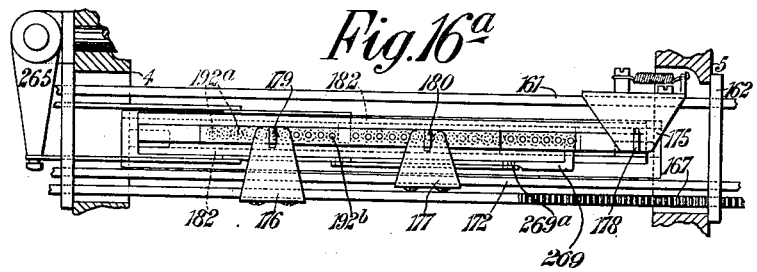
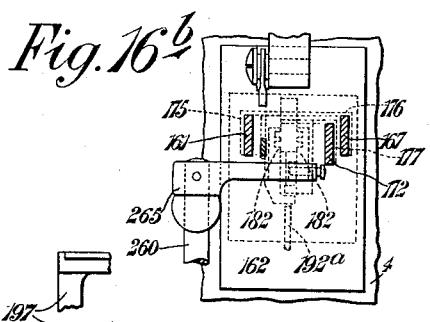
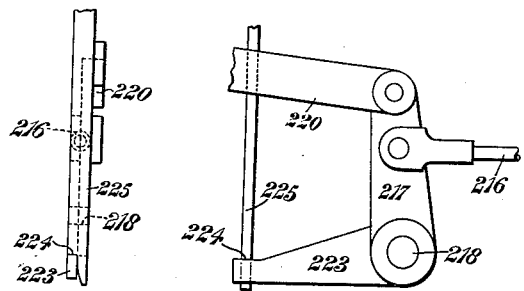
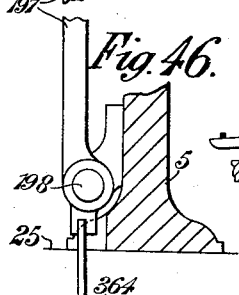
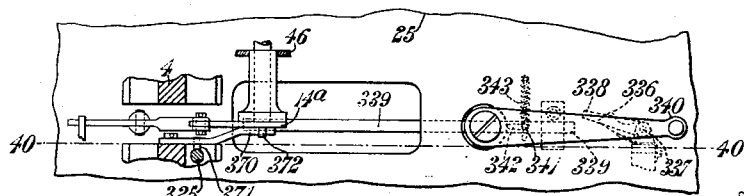
Witnesses
Inventor
per Chas.␣Woodroffe,
Attorney

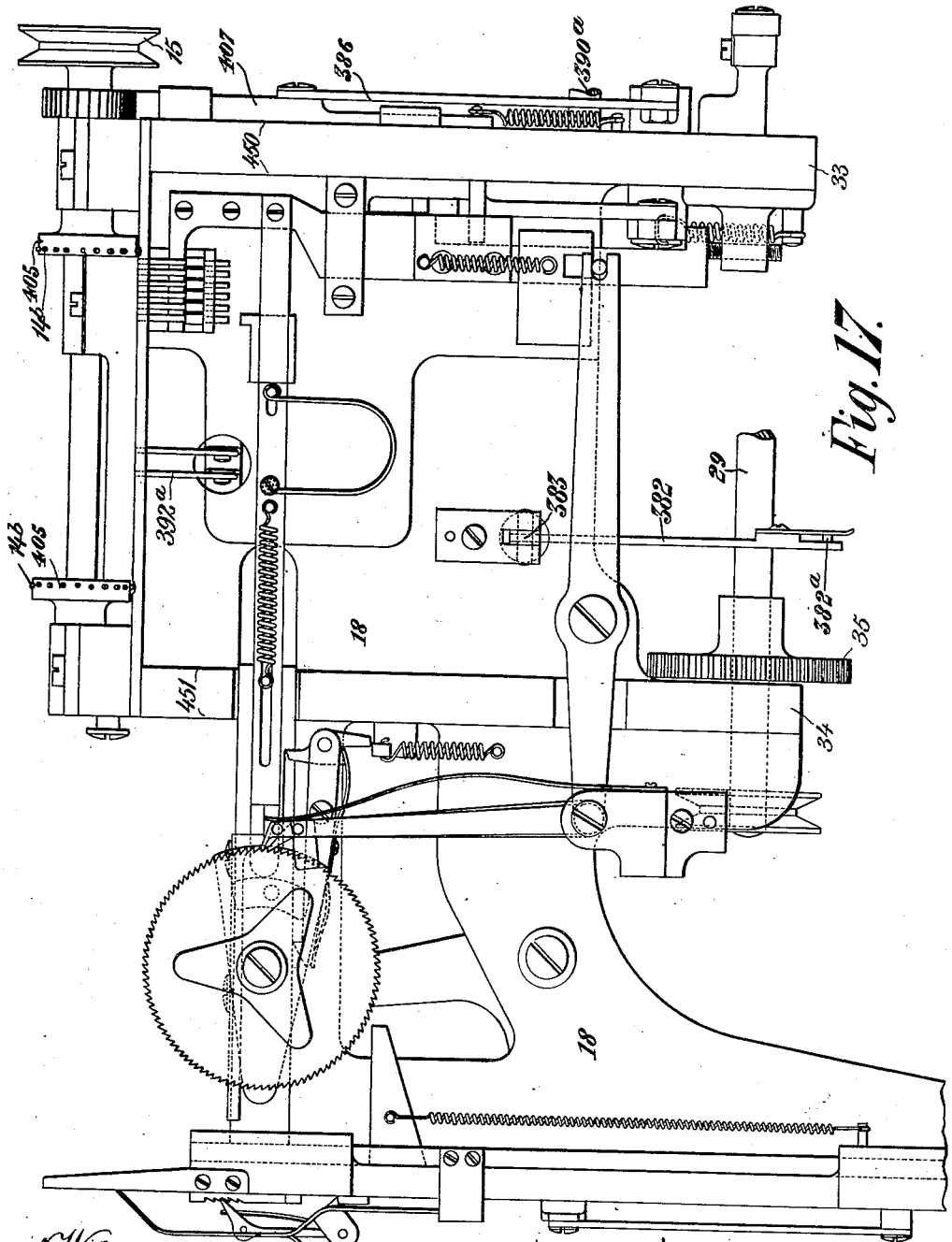

Figure 18:
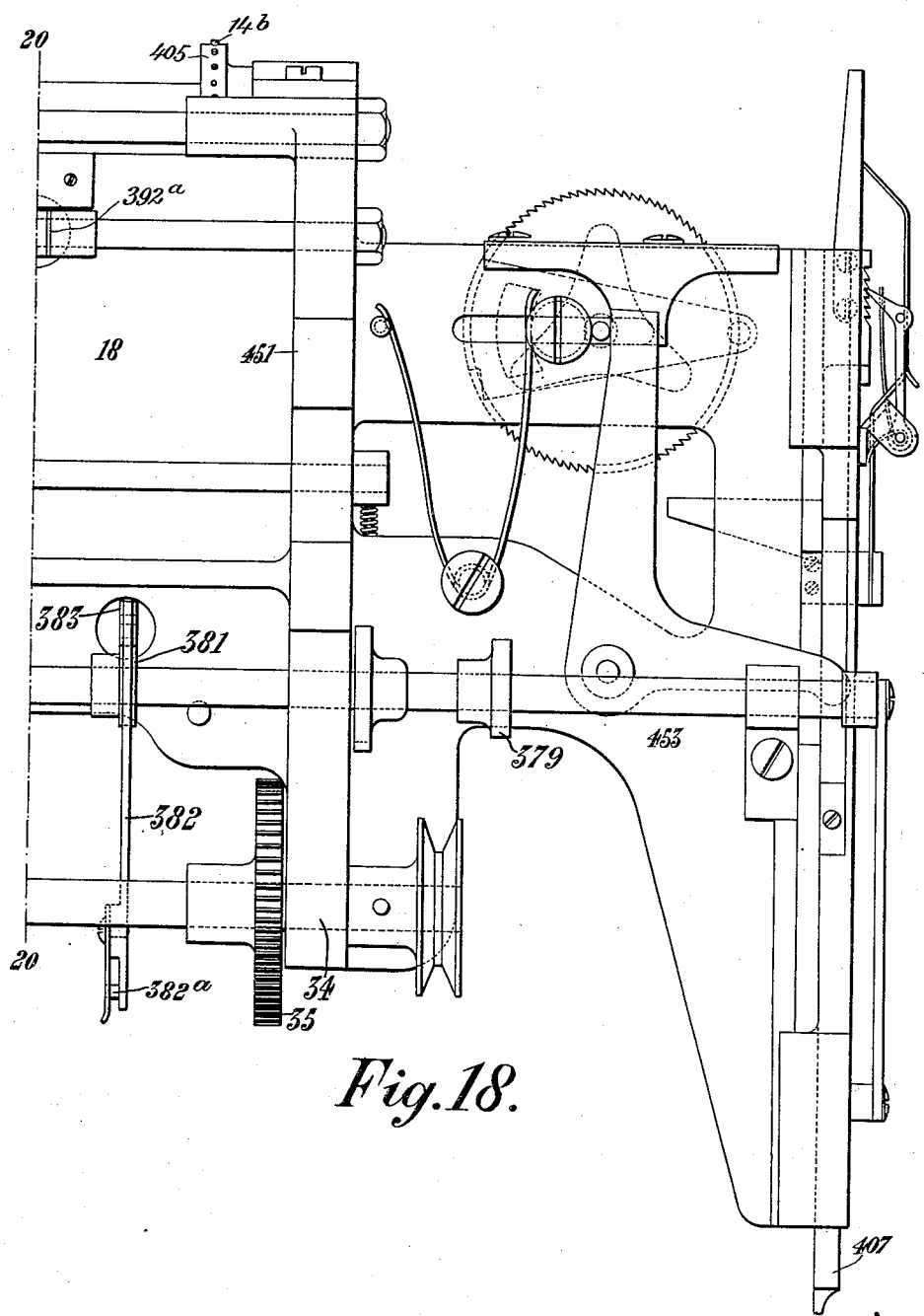

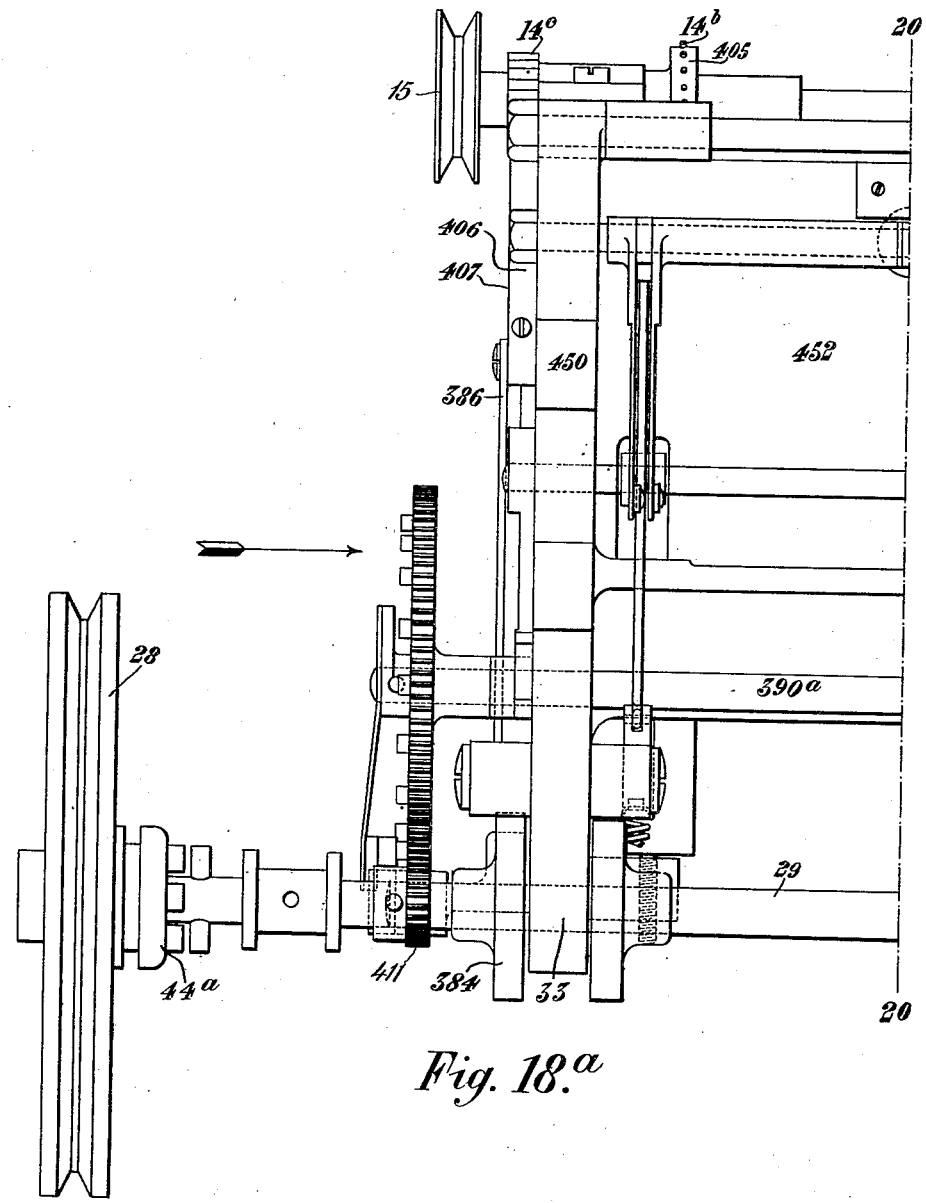
Fig. 18.ᵃ

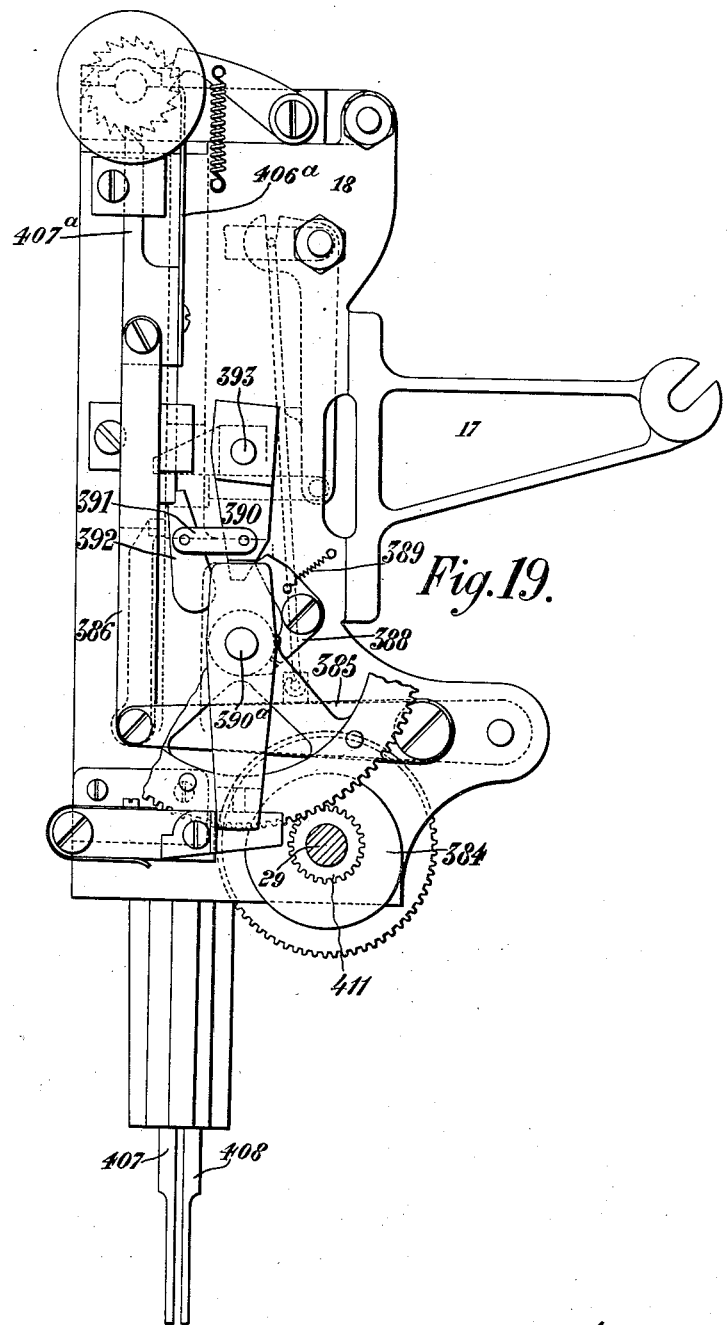

W. G. WHITE.
MECHANICAL CONTROLLER COMPOSING MACHINE.
APPLICATION FILED SEPT. 11, 1905.

943,611.

Patented Dec. 14, 1909.
35 SHEETS—SHEET 29.

Witnesses

Inventor per Attorney

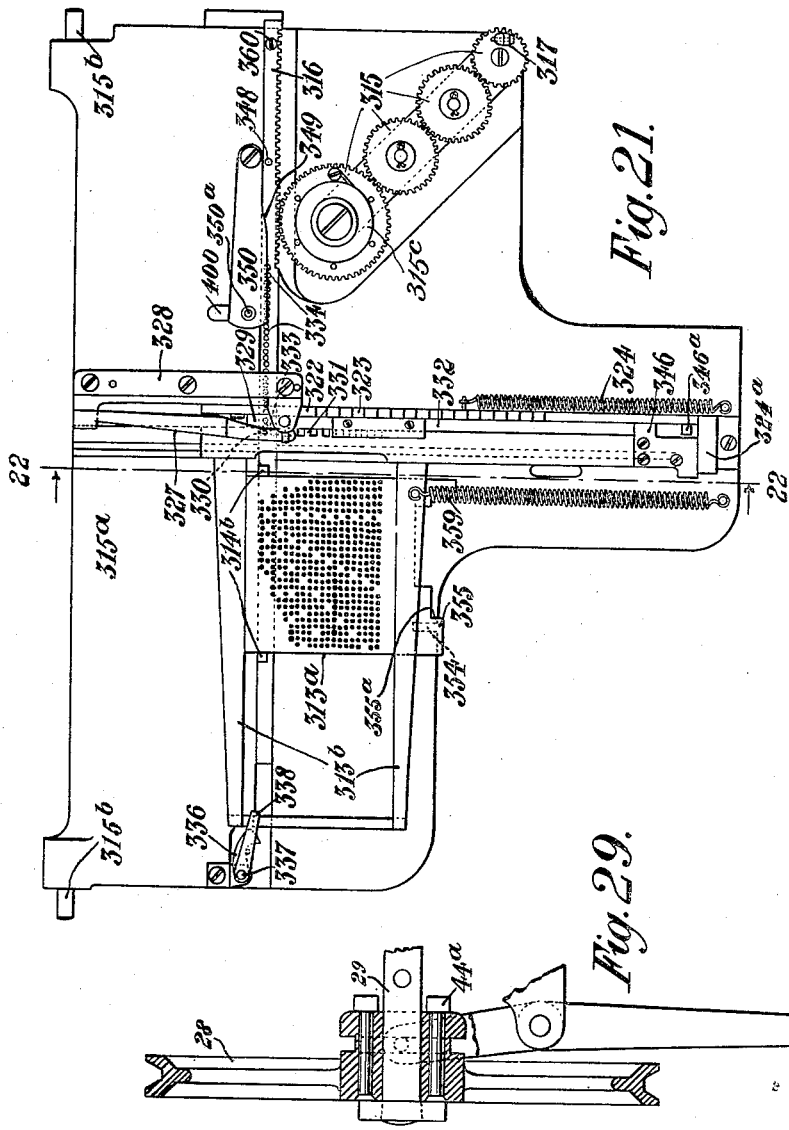

W. G. WHITE.
MECHANICAL CONTROLLER COMPOSING MACHINE.
APPLICATION FILED SEPT. 11, 1905.

943,611.

Patented Dec. 14, 1909.
35 SHEETS—SHEET 31.

Witnesses

Woodman G. White
Inventor per Chas S Novaroffe
Attorney

W. G. WHITE.
MECHANICAL CONTROLLER COMPOSING MACHINE.
APPLICATION FILED SEPT. 11, 1905.
943,611.
Patented Dec. 14, 1909.
35 SHEETS—SHEET 32.
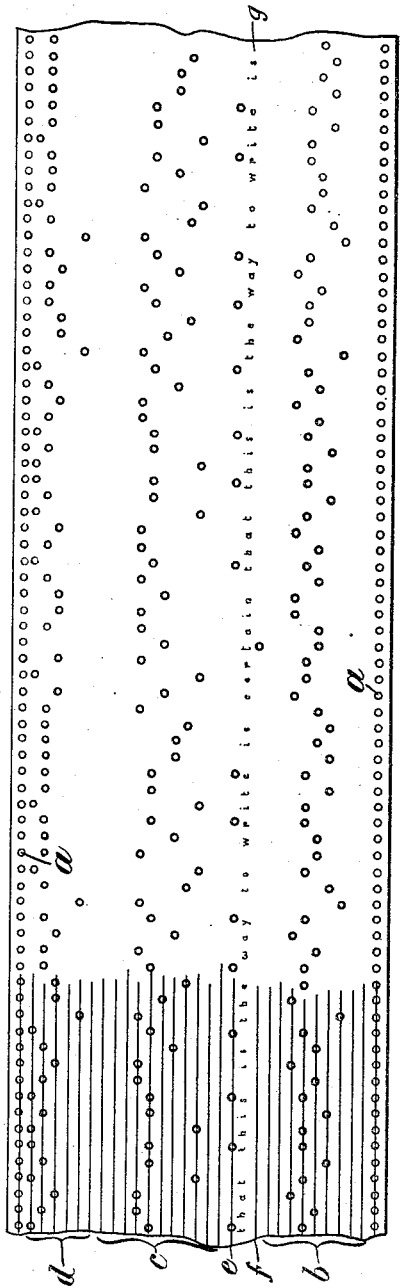
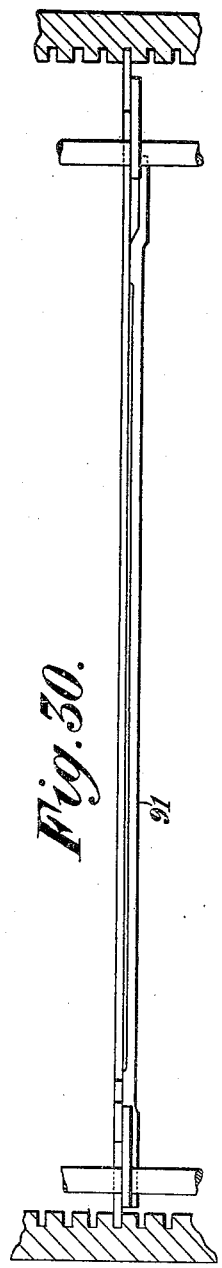
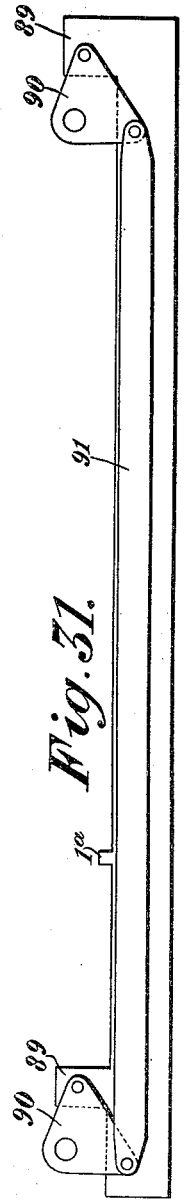

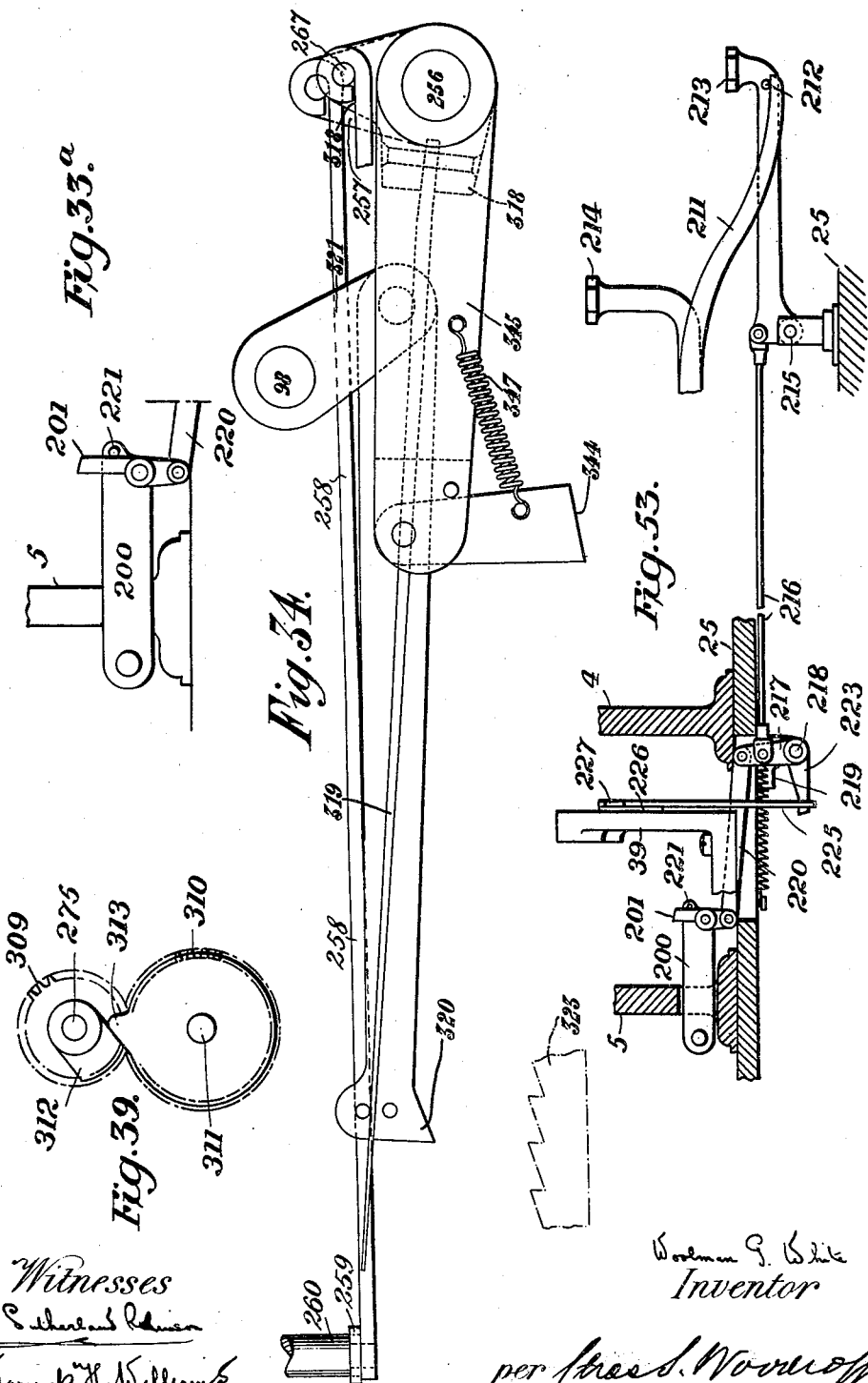

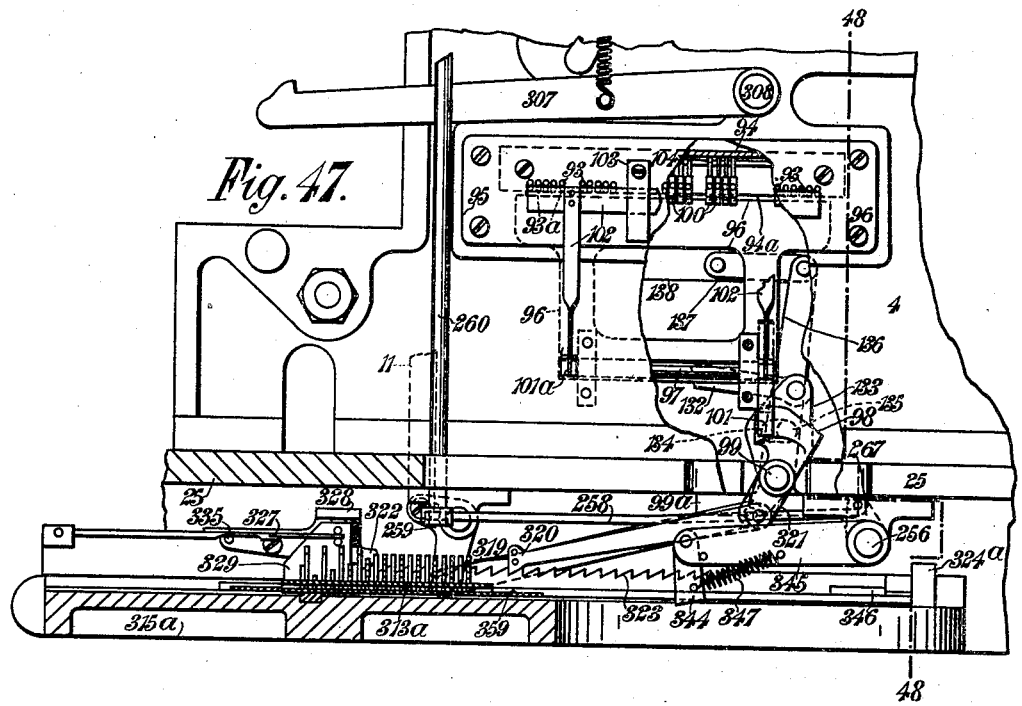

W. G. WHITE.
MECHANICAL CONTROLLER COMPOSING MACHINE.
APPLICATION FILED SEPT. 11, 1905.

943,611.

Patented Dec. 14, 1909.
35 SHEETS—SHEET 35.

Witnesses

Woolman Gibson White
Inventor per Chas. S. Woodroffe,
Attorney

UNITED STATES PATENT OFFICE.

WOOLMAN GIBSON WHITE, OF WASHINGTON, DISTRICT OF COLUMBIA, ASSIGNOR TO LINOTYPE AND MACHINERY LIMITED, OF LONDON, ENGLAND.

MECHANICAL-CONTROLLER COMPOSING-MACHINE.

943,611.     Specification of Letters Patent.     Patented Dec. 14, 1909.

Application filed September 11, 1905. Serial No. 277,878.

*To all whom it may concern:*

Be it known that I, WOOLMAN GIBSON WHITE, of 503 B street northeast, Washington, District of Columbia, United States of America, have invented certain new and useful Improvements in Mechanical-Controller Composing-Machines; and I do hereby declare the following to be a full, clear, and exact description of the invention, such as will enable others skilled in the art to which it appertains to make and use the same.

The present invention relates to improvements in mechanical controllers and also in the machines for making them of the type described in the specification of Letters Patent 536149 March 19th 1895.

Figure 1:
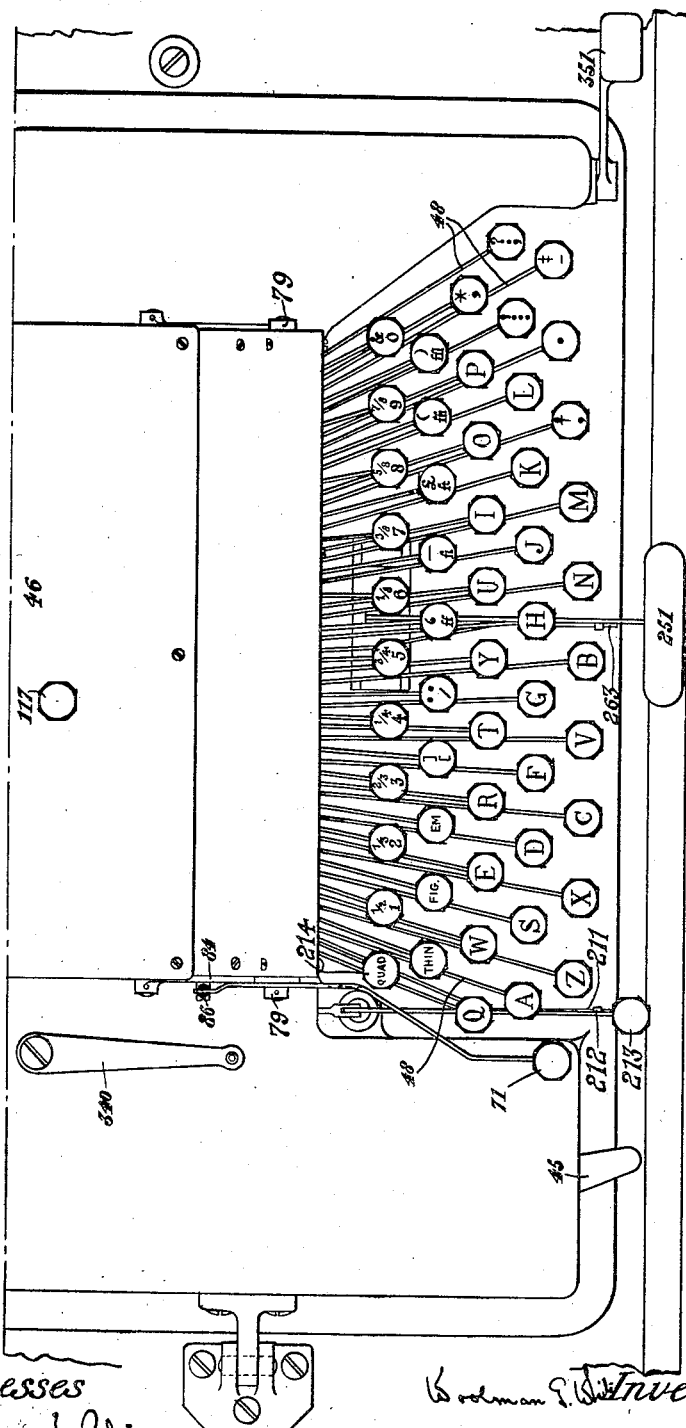
Figure 3:
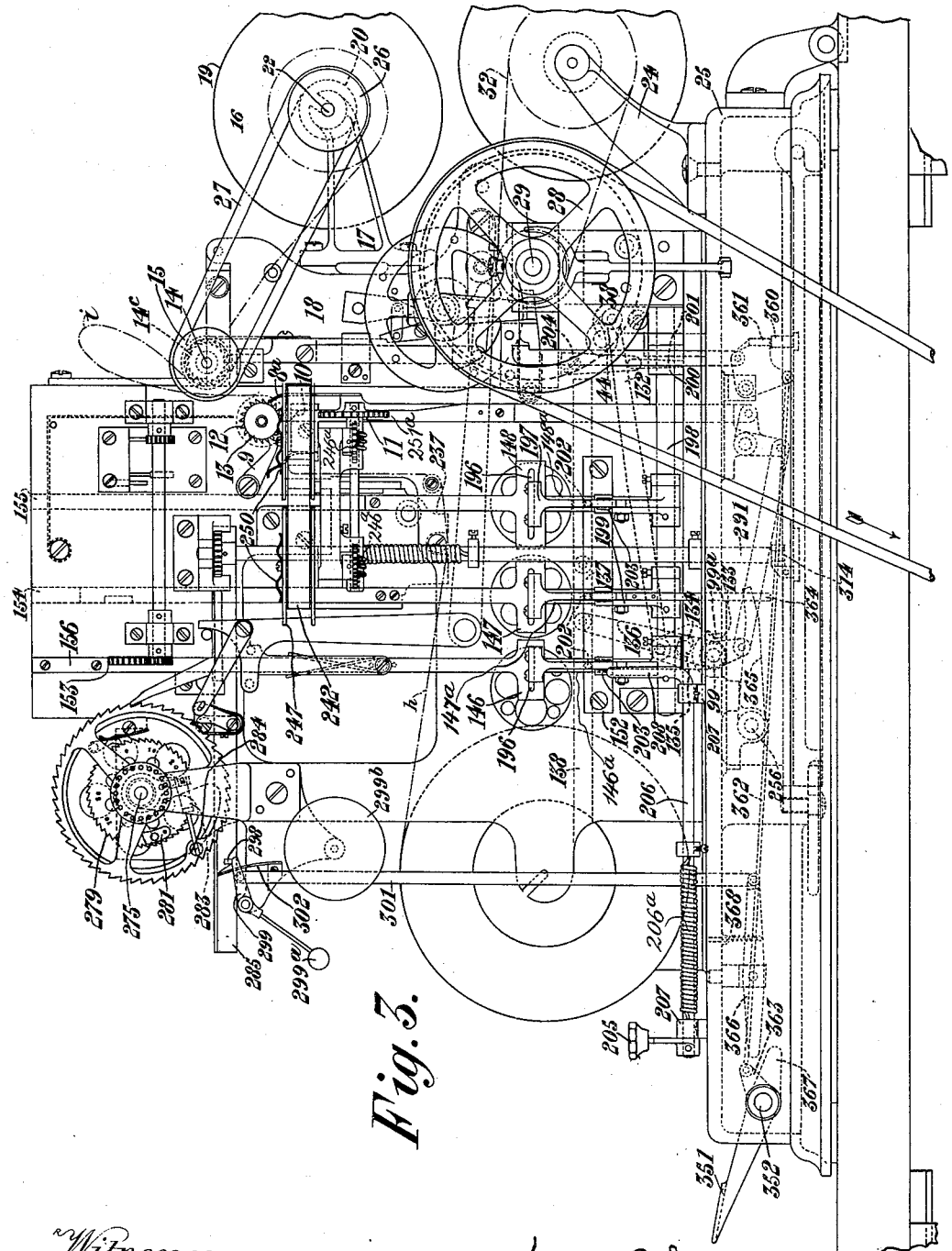
Figure 5:
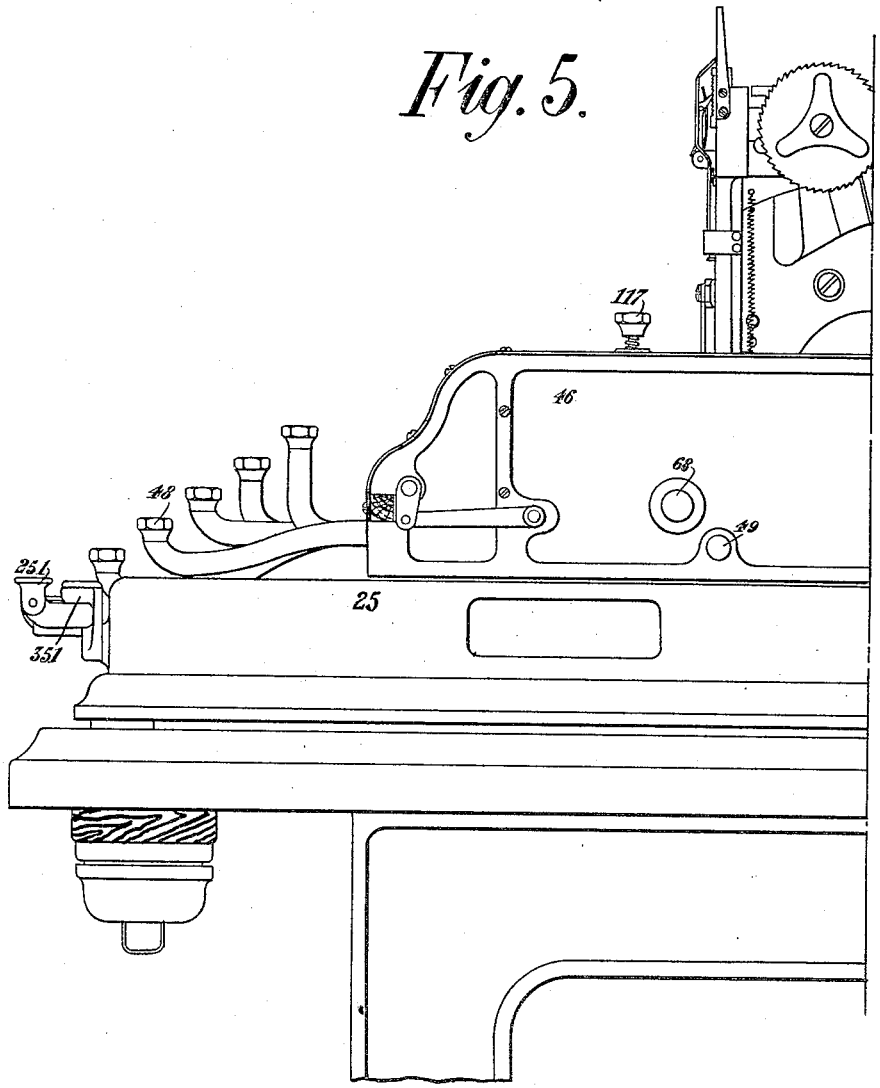
Figure 8:
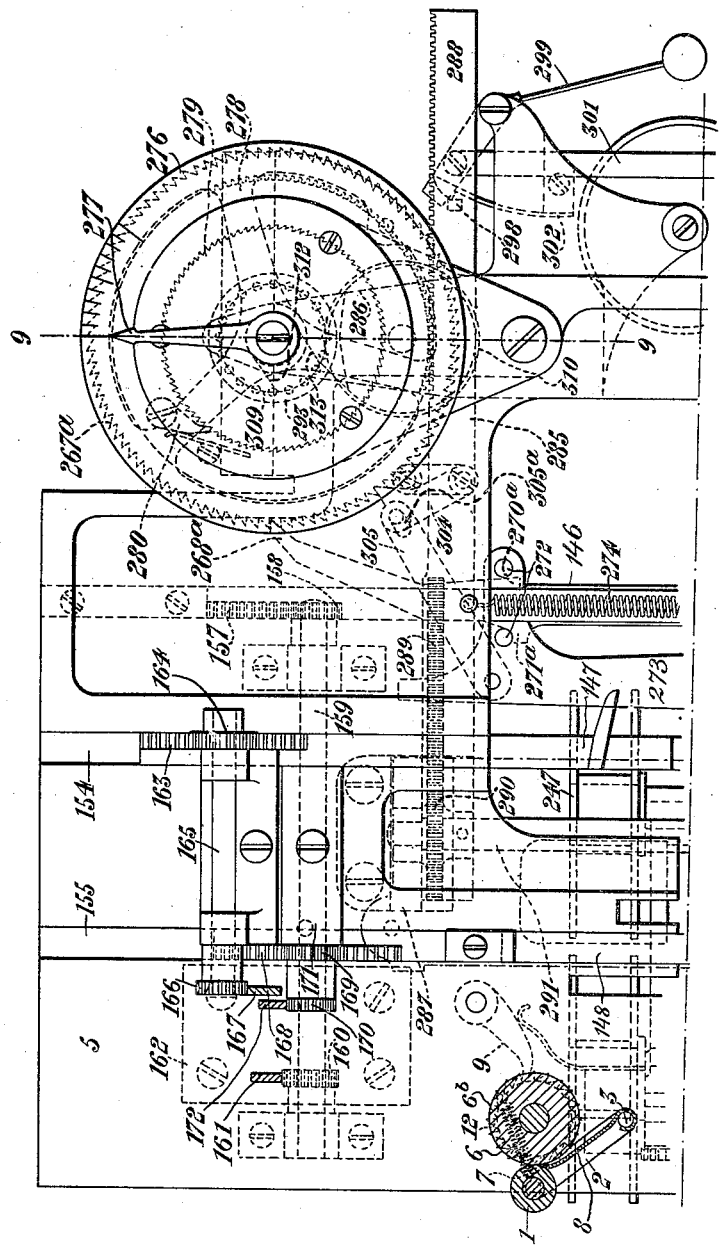
Figure 8A:
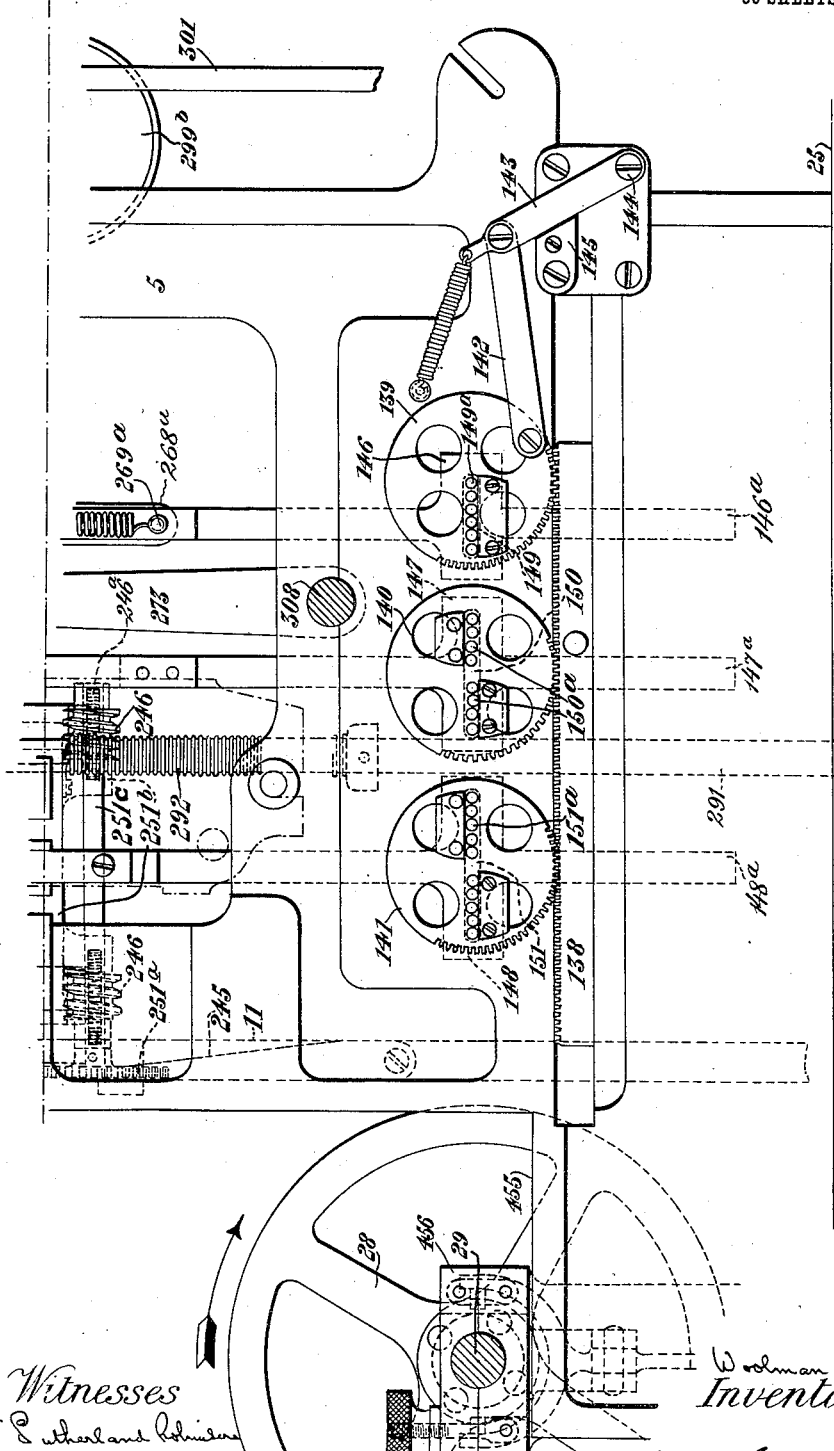
Figure 9:
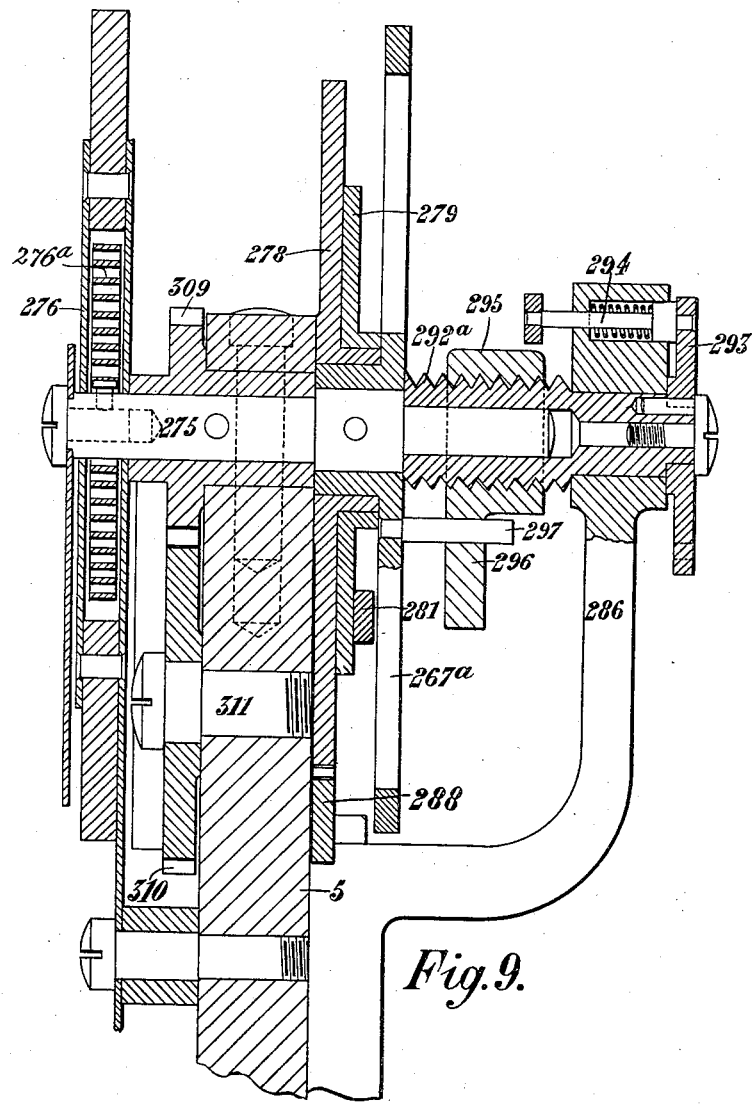
Figure 10:
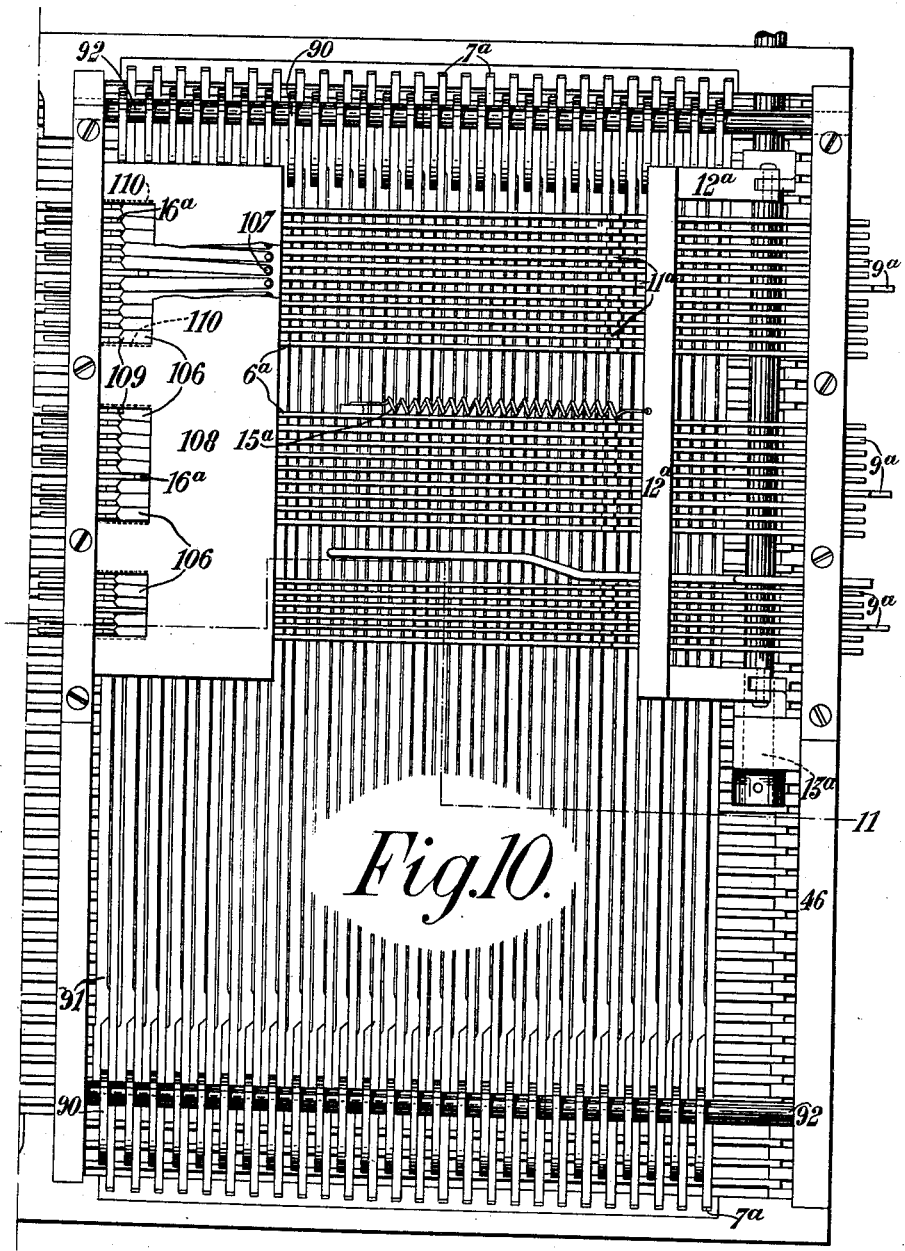
Figures 11, 37, 38:
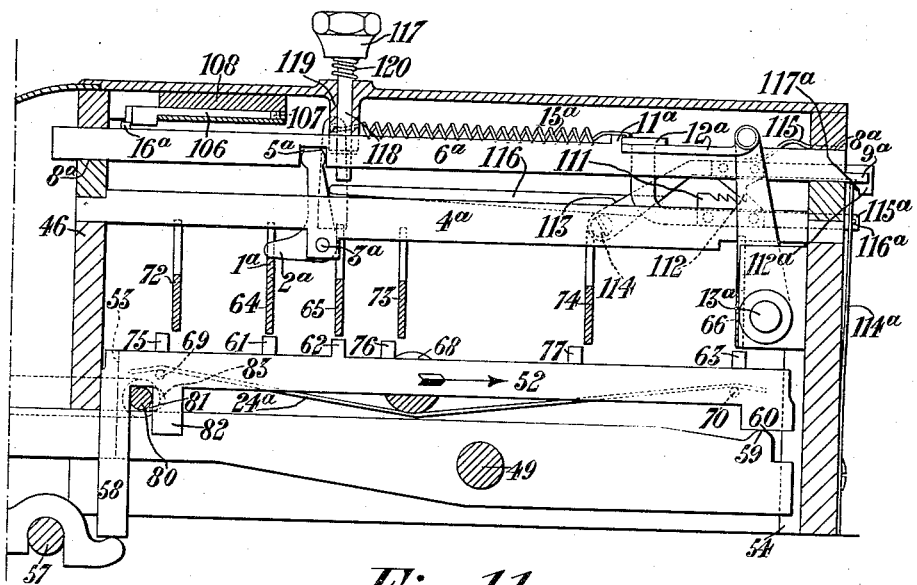
Figure 14:
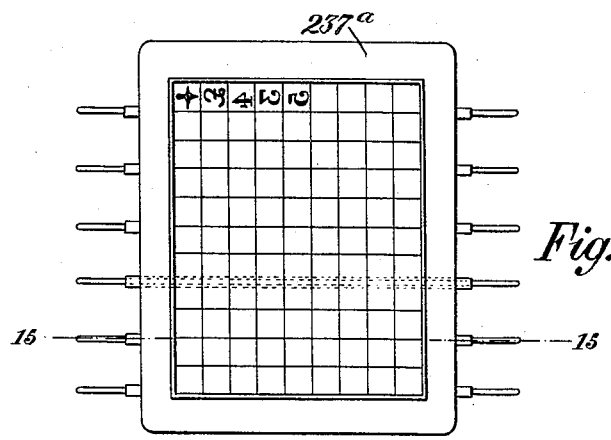
Figure 15:
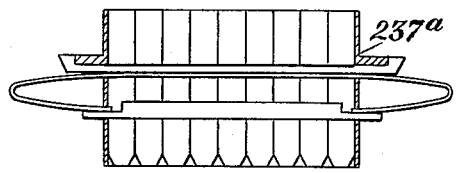
Figure 26:
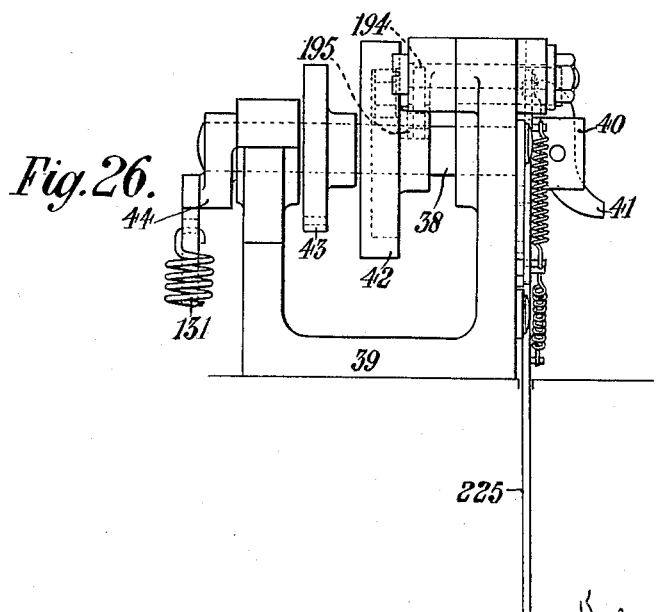
Figure 16:
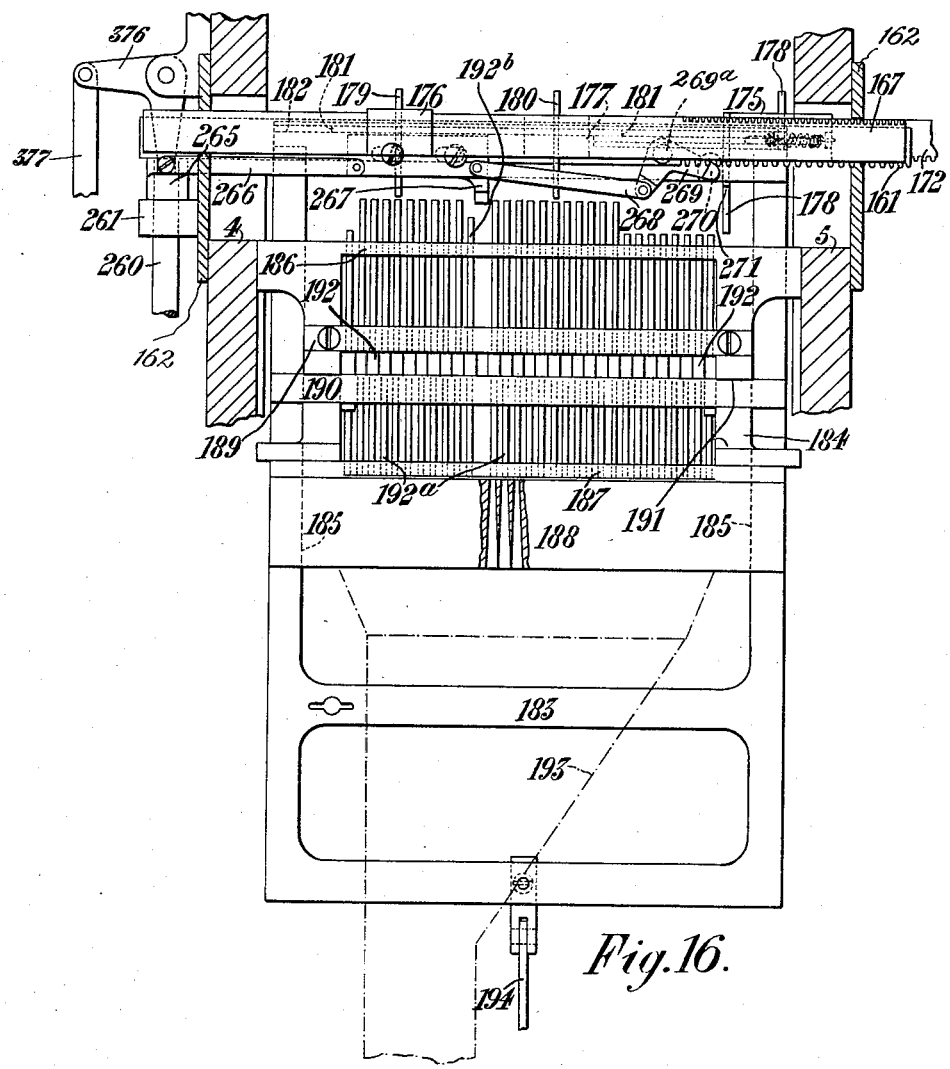
Figure 20:
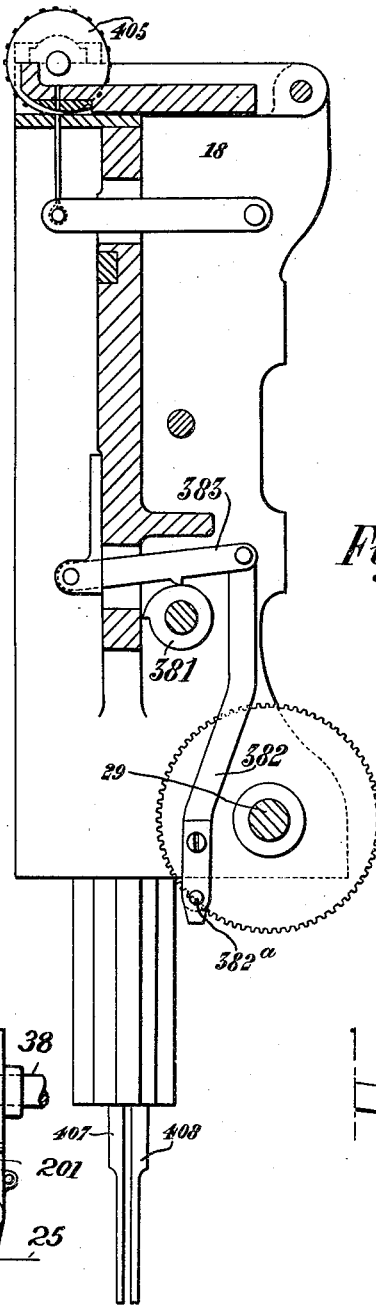
Figure 42:
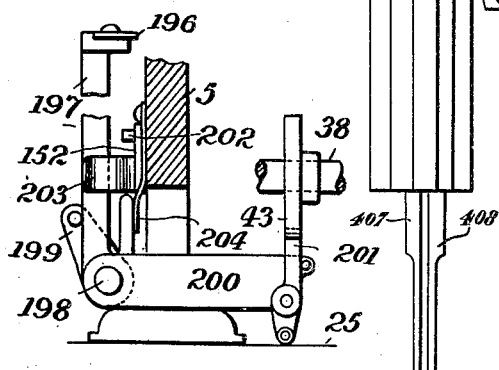
Figure 33:
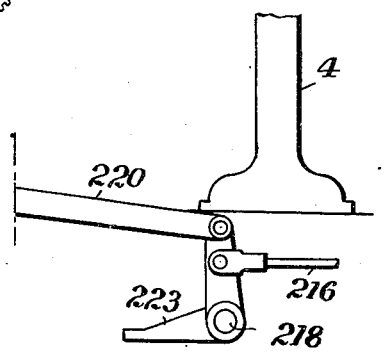
Figure 22:
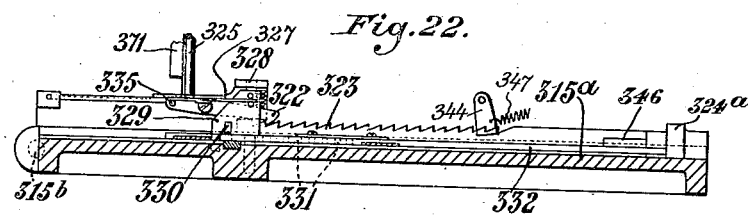
Figure 23:
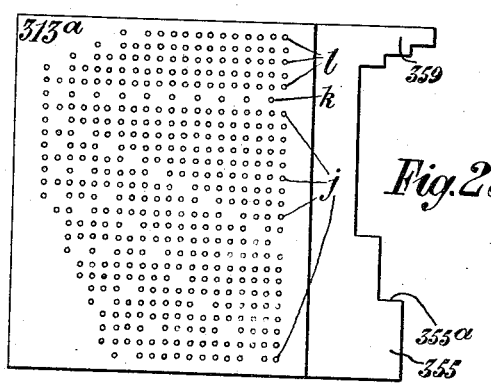
Figure 24:
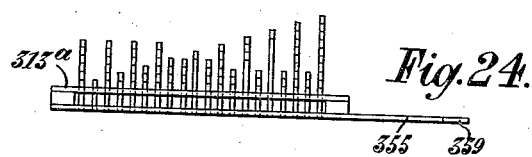
Figure 27:
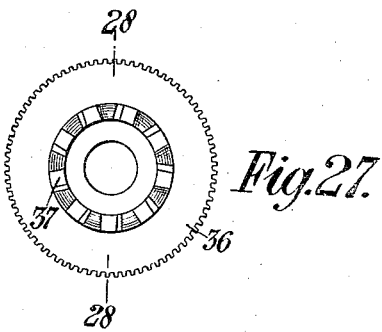
Figure 28:
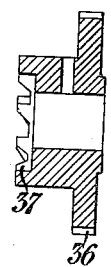
Figure 49:
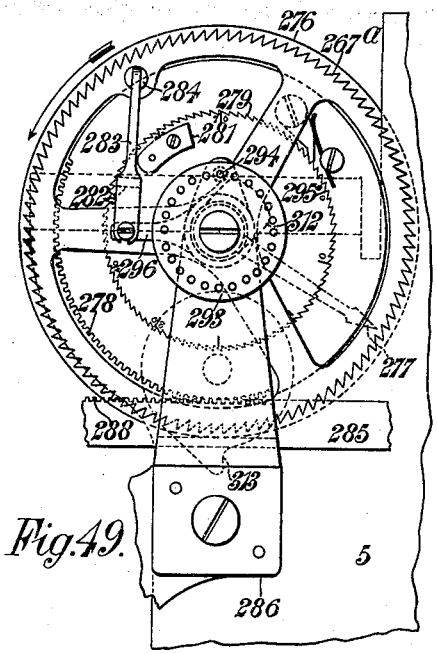
Figure 50:
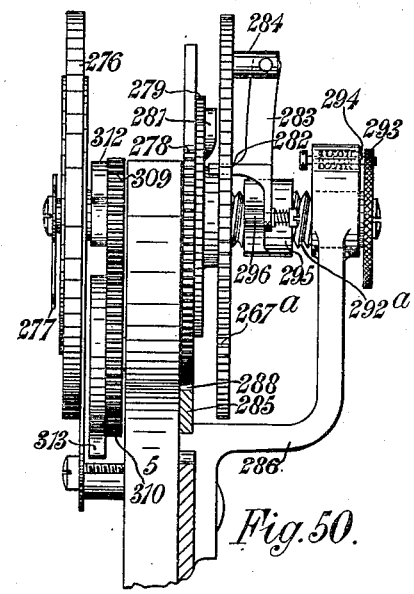
Figure 51:
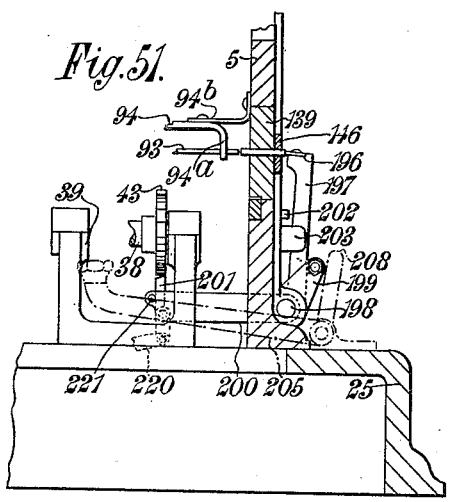
Figure 52:
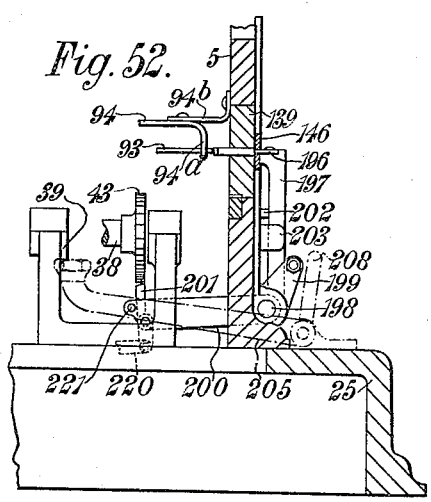

Referring to the accompanying drawings, Figures 1 and 1ᵃ are respectively a front and a rear half of a plan: Figs. 2 and 2ᵃ, respectively a right and a left-hand half of a front elevation: Fig. 3, a rear elevation: Figs. 4 and 4ᵃ respectively a front and a rear half of a side elevation from the left: Figs. 5 and 5ᵃ respectively a front and a rear half of a side elevation from the right: Figs. 6 and 6ᵃ respectively a front and a rear half of a plan of the bed plate and the mechanisms immediately attached to it: Figs. 7 and 7ᵃ respectively an upper and a lower half of a front elevation of the front standard of the machine and the mechanisms which it carries: Figs. 8 and 8ᵃ, respectively an upper and a lower half of a front elevation of the back standard of the machine and the mechanisms which it carries: Fig. 9, a section on the line 9—9 of Fig. 8: Figs. 10 and 10ᵃ, respectively a rear and a front half of a plan of the key-box without its cover: Figs. 11 and 11ᵃ, respectively the rear and the front half of a section on the line 11—11 of Figs. 10 and 10ᵃ: Fig. 12, a front elevation of the type-writer frame: Fig. 13, side elevation thereof: Fig. 14, a front elevation of the type-writer: Fig. 15, a section on the line 15—15 of Fig. 14: Fig. 16, a front elevation of the striker frame: Fig. 16ᵃ, a plan of the striker frame: Fig. 16ᵇ, an end elevation of a part of the striker frame: Fig. 17, a front elevation of the justifier bracket: Figs. 18 and 18ᵃ, respectively a right and a left-hand half of a rear elevation of the same: Fig. 19, a side elevation of it from the right: Fig. 20, a section on the line 20—20 of Figs. 18 and 18ᵃ looking in the direction of the arrow in Fig. 18ᵃ: Fig. 21, a plan of the shelf that carries the key-piece of the justifier: Fig. 22, a section on the line 22—22 of Fig. 21: Fig. 23, a plan of the key-piece: Fig. 24, an end elevation of Fig. 23: Fig. 25, an end elevation of the main bearing from the front: Fig. 26, a side elevation of the same bearing from the left of the machine: Fig. 27, a rear elevation of the main driving clutch: Fig. 28, a section on the line 28—28 of Fig. 27: Fig. 29, a sectional elevation of the driving pulley: Fig. 30, a plan, Fig. 31, a front elevation of a detail of the key-box mechanism: Fig. 32, a plan of a piece of the improved controller: Figs. 33 and 33ᵃ respectively the front and rear halves of a left-hand side elevation of part of the quad operating devices: Fig. 34, a detail on an enlarged scale of a portion of Fig. 6: Fig. 35, an end elevation and Fig. 36, a side elevation of a detail: Fig. 37, a rear elevation and Fig. 38, a plan of the mechanism which operates the bell clapper: Fig. 39, a front elevation of the stop for the unit counting mechanism: Fig. 40, a section on the line 40—40 of Fig. 41: Fig. 41, a plan of an automatic device to prevent over-running: Fig. 42, a side elevation of a detail: Fig. 43, a plan: and Fig. 44, an elevation of part of the unit transferring mechanism: Fig. 45, an enlargement of a portion of Fig. 43; and Fig. 46, a detail of the spring finger 364. Fig. 47 is a front elevation, partly in section, of a part of the front standard, showing the intermediate pins and parts in immediate connection, together with a portion of the justifier mechanism: Fig. 48, a section on the line 48—48 of Fig. 47, taken from the right-hand side of the machine: Fig. 49, a rear elevation of the unit transferring mechanism; Fig. 50, a right-hand end elevation of the same: Figs. 51 and 52, sectional elevations of part of the rear standard, showing the wheel pin ejector in two different positions. Fig. 53 is a side elevation of a portion of the quadding mechanism.

*Controller.* (Fig. 32.)—The holes in the improved controller are made, as in the previous type, along imaginary parallel lines (indicated by the broken lines at the left-hand end of the figure) extending lengthwise of it. These holes were made by vertically acting punches actuated through interponents made to stand over them at the required moment. These punches are not large in diameter and were arranged so close together, that an interponent would frequently, especially if it had a little play, strike the next punch as well as the one it was intended to strike. To prevent this, the punches of the present invention are set farther apart than heretofore, with the result that the rows of perforations in the controller are likewise wider apart than in the previous patent. $a, a$ are the feed holes; $b$, a group of nine rows of character holes to coöperate with one coördinate wheel of the type casting machine and $c$, a second group, but of eleven rows, of character holes to coöperate with the other coördinate wheel; $d$, a group of six rows for justification; $e$, a row to indicate where the spaces occur in a line of composed matter and which start the justifier, and $f$ a row of holes to work the galley of the casting machine—a total of thirty rows. In the previous patent, the rows $e$ and $f$ were next and close to the rows $a$ respectively, thereby weakening both sides of the controller with the result that it was frequently torn. According to the present invention, they are arranged along the middle of the controller. $g$ is the printed record of the composition and is between the rows of holes $e$ and $f$.

*Controller feed.* (Figs. 1, 3 and 8.)—In the patent 536149, this feed has a pricker roller 91 to draw the paper ribbon $h$ along with a measured step by step motion that results in the transverse rows of holes including the feeding holes being at equal distances apart. The marks made by the pricking of this roller 91 are visible in the finished controller. But these prickers dragged on the ribbon and tore it sometimes. To prevent this tearing, there is now a ribbon roller 1 turning freely in a pair of arms 2, 2, fast upon a shaft 3 turning in the standards 4, 5 of the machine. The ribbon passes between the roller 1 and the pricker roller 6, the prickers 6ᵇ now not only piercing the ribbon $h$ but engaging in the roller 1 which being carried round by the prickers, the ribbon travels as fast as the prickers so that the latter cannot tear the ribbon. 7, 7 are springs pulling from the respective standards 4, 5 upon the ends of the shaft 3 to urge the roller 1 toward the pricker roller 6. There is now also a ribbon guide consisting of a curved plate 8 fast upon the shaft 3 between the arms 2, 2, the object of this guide being to conduct that ribbon—especially the leading edge of a new ribbon, fairly between the two rollers 1 and 6. The roller 6 is of the same diameter throughout in the same way as is the roller 1—not disks on the ends of a shaft only.

The roller 91 in the prior patent above mentioned was turned (see Fig. 9 of it) by a pair of pawls 119, 120, the pawl 119 beginning the motion and 120 completing it and locking the roller against overthrowing. The disadvantage of this arrangement was that the operator could not turn the roller 91 by hand. He may want to do this when there is an erroneously perforated part of the controller to be cut out and the ribbon to be reëngaged with the rollers 1 and 6, also there is the blank at each end—leading end of the ribbon $h$ and concluding end of the controller—to be fed through the machine and as he could not turn the roller 6 by hand, he had to turn it from the keyboard and that involved keeping the machine in operation and also resulted in loss of time.

According to the present improvement,—see Fig. 3—the pawl 8ᵃ corresponds with the pawl 119 above mentioned and the spring-actuated detent 9 is actuated in the same way as the detent 122 of the previous patent as is also the nose 10 of the slide 11 that turns the ratchet wheel 12 fast on the shaft of the pricker roller 6. But the nose 10 of the slide 11 does not do anything in the way of locking the roller 6, for as soon as it has done its share of turning that roller, it descends and remains clear of the ratchet wheel 12. The latter is then under the control of the pawl 8ᵃ and the detent 9 and can be turned freely by hand forward (it is never required to be turned backward). To facilitate this turning, the shaft of the roller 6 carries a milled head 13.

In the previous patent the controller $i$ was delivered from the machine to go where it liked after it had left the justifier. According to the present invention, the shaft 14 carries a V-grooved pulley 15 fast on it. This shaft 14 carries a pair of disks from which project feed pins 14ᵇ—Figs. 18 and 18ᵃ—the combination discharging the function of a paying-out roller. A reel 16 is carried in brackets 17, 17, both fast to the bracket 18 that carries the justifier. The reel consists of a pair of end disks 19, 19, a wood core 20 slotted at 21—Fig. 1ᵃ—to receive the end of the controller, and a shaft 22 held to the core by a suitable device and turning in oblique notches in the ends of the brackets 17, 17. The reel shaft 22 has a V-grooved metal pulley 26 fast on it and a spiral metallic wire cord 27 (preferably of circular section so that it shall have only two arcs of contact with each pulley) is led around the two pulleys 15 and 26. It is important that the band 27 and the pulley 26 should be metallic to facilitate the slip between them next mentioned. The pulley 26 is also of a small diameter so that the belt shall have only a short arc to bite on. Now the practical diameter of the reel 16 is constantly increasing and it therefore becomes necessary to prevent the consequent pull on the controller $i$ tearing it where the feed pins 14 are engaged in the feed holes $a, a$. The cord 27 is, by its construction, elastic, and its tension when the reel 16 is empty, is so adjusted that as the reel fills and begins to pull, the cord shall stretch and slip, the tension being less than the tearing strength of the controller i. The reel 16 will, of course, have the leading end of the controller next to its core and the concluding end on the outside. But the casting machine—capable it is true of taking the controller either way because the justifying perforations follow the respective words, i. e., are positioned where the respective spaces come—is used with the best effect when the controller is fed to it in the natural way; and to meet this use, the present invention includes a second or rewinding reel 23 of the same construction as the reel 16. These brackets 24 are both mounted on the bed plate 25. The reel 23 is driven from the driving pulley of the machine, 28, through a small pulley 30—Fig. 1—fast on the end of the main driving shaft 29, and a belt 32 passed around the pulley 30—Fig. 1—and the pulley 31 on the shaft of the reel. This rewinding reel rotates at 500 revolutions a minute so that it does not take long to empty the top reel 16. The paying-out roller 14 being locked against reverse motion by the ratchet and pawl device 14$^c$, the belt 27 is used as a brake during the rewinding by being left on its pulleys during the rewinding, to keep a tension on the controller i, as it is pulled off the top reel by the rewinding reel 23.

*Driving shaft and connections.* (Figs. 4$^a$, 18 and 18$^a$, 25, 26, 27, 28 and 29).—This shaft 29 differs from that of the prior patent in the two parts of it (one on each side of the clutch in that patent) being parallel, instead of alined, with each other, and in being carried by the justifier bracket 18. 32$^a$ is a bearing for it provided by a bracket bolted to the standard 5. Its next bearing 33 is in the justifier bracket 18; the next (and last) one 34 in the same bracket 18 but in the opposite side of it. 35 is a spur gear fast on the end of the shaft 29 and gearing with a spur gear 36 incorporated with the clutch 37. 38 is a cam shaft alined with the axis of the clutch 37 as shown in Fig. 4$^a$ and is the equivalent of the escape shaft 7 of the previous patent. It turns in bearings in the central bracket 39. 41 is the pawl pivoted in a block 40 fast on the end of the shaft 38. 42 is a cam that works the striker frame. 43 is a cam to expel wheel pins from the coordinate wheels. 44 is a crank that rocks the coördinate wheels. Thus 38 is the cam shaft controlling the principal operations of the machine. 44$^a$ is a clutch between the driving pulley 28 and the shaft 29, and is under the control of the operator, by means of a hand lever 45. This pulley 28 is loose on the shaft 29 and the clutch (part of which is incorporated with the pulley) is of the usual type, i. e. having forked end and sliding clutch with pin fast on the shaft for the forked end of the clutch to embrace as shown in Figs. 5$^a$ and 29.

*Key-box.* (Fig. 1, 2, 2$^a$, 4, 5, 10, 10$^a$, 11 and 11$^a$.)—46 is the key box in which the character key levers and some of their coöperating parts are mounted. It consists of a top, a front, a back, and two sides, and has an open bottom. It stands upon the bed-plate 25 and is held in position thereon by any suitable device that will allow of it being easily detached from the same and easily replaced thereon. The character key levers 48 are all pivoted upon a rod 49, the ends of which are supported by the respective sides of the key box 46, and pass under a bar 50 having a facing 51 of suitable cushioning and silencing material up to which they are automatically returned after depression, and which makes them hold their rear ends at the same level. 52 is a horizontal bar extending from the front to the back of the box 46 and capable of a vertical reciprocating motion in guides 53, 54 formed upon the inner faces of the said front and back respectively. There is one bar 52 to each key lever 48, the connection between them consisting of a shoulder 55 on the bottom edge of 48 and constantly in contact with the adjacent nose of a lever 56 fulcrumed on a fixed rod 57, the rear nose of each lever constantly in contact with the bottom end of a long lug 58 depending from the respective bar 52, and a shoulder 59 on the top edge of the lever 48 at its rear end engaging with a shoulder 60 on the bottom edge of the said bar 52. A bar 52 carries three pins 61, 62, 63, upstanding somewhere along its top edge and fast thereto, each pin standing under its respective permutation bar 64, 65, 66 and at only a short distance below it. All the pins are divided functionally into three sets, one of each set being shown in Fig. 11. So likewise with the permutation bars. 24$^a$ is a bar spring for each bar 52 having for its base the under side of a rod 68 fast by its ends to the respective sides of the key box as shown in Fig. 5 and having its respective ends engaging with a constant downward pressure upon pins 69, 70, fast to and projecting laterally from the bar 52. The depression of a key lever 48 raises a bar 52 against the resilience of the spring 24$^a$, and makes the respective set of pins 61, 62, 63, engage and raise the respective permutation bars 64, 65, 66. As the pins are near the permutation bars, the key lever has only a short distance to rock so that the elevation of the permutation bar is effected quickly. As soon as the key lever is released, the spring 24$^a$ returns the bar 52 to the normal level and the key lever up to the faced bar 50 which thus serves as a stop to all the key levers alike. 71 is the shift key to effect change of font, and to enable it to accomplish its purpose, there is a second service of permutation bars divided into three sets, and a second service of pins. 72, 73 and 74 are one of each set of permutation bars and 75, 76 and 77 one of each set of pins. The shift key 71 is fulcrumed on a rod 78 extending across the front of the keyboard where it is supported by the two rings 79, 79, fast thereto, and is connected to all the bars 52 by a rod 80 standing in a series of slots 81 between the lugs 58 and complementary lugs 82 and capable of a short reciprocating horizontal motion in slots 83 (only one shown) on the respective sides of the key box 46 in which slots its ends engage. 84 is a link extending from each end of the rod 80 toward the front. The front end of one link is pivotally connected to the shift key 71 at a point 85 beneath the axis of the rod 78 and that of the other to a corresponding arm or half crank fast on the respective end of the rod 78. 86 is a returning spring pulling from a fixed point 87 on the nose of a rearward continuation 88 of the shift key 71. The guide 54 is wide enough to allow of the shift motion of the bars 52. The depression of the shift key 71 acting through the links 84 and the rod 80, pushes all the bars 52 to the rear far enough to make the pins 75, 76, 77 register with the permutation bars 72, 73, 74 respectively and the pins 61, 62, 63 stand clear of the respective permutation bars 64, 65, 66. The motion of the rod 80 is limited in both directions by the ends of the slots 83. All the permutation bars of both services extend across the key box. They must rise and fall vertically in their guiding slots $7^a$ in the key box sides. But only the minority of the pins on the bars 52 can occupy a median position thereon, the majority being more or less near the ends of the permutation bars. Now, a pin engaging the end of a bar would tend to tilt it and jam its ends in the respective slots $7^a$; so to prevent that, they are all supported by the following means.

Referring to Figs. 10, 30 and 31, each permutation bar has a lug 89 at each end, to which one arm of a bell crank lever 90 is pivotally connected. The opposite arms of the two respective levers are linked together by a link 91. This produces two rows of levers 90, one near each side of the key box and those of each set are fulcrumed upon a rod 92, the ends of which are respectively fast in the front and back of the key box 46. This combination of a pair of bell crank levers 90 and one link 91 constitutes a parallel motion device, and the respective positions of the several fulcra and parts of it may be varied, provided that its functions are retained.

It has been explained that three permutation bars are raised together by the depression of a single key lever 48. When a set of three permutation bars rise, they engage by projections $1^a$ properly positioned on the top edge of the respective bars with the front ends of as many bell crank levers $2^a$. All these levers $2^a$ are of the same size, all stand with their internal angles to the front of the key box and all must rock through the same angle and in the same direction. Each one is fulcrumed on a pin $3^a$ fast to and projecting laterally from a bar $4^a$ fixed by its respective ends to the front and rear of the key box 46. Now the three fulcra $3^a$ of any three levers $2^a$ must be so situated that their front ends are over the projections $1^a$ of the respective permutation bars. The consequence is that the levers $2^a$ are staggered across the key box 46. As a permutation bar can engage its lever $2^a$ only by its projection $1^a$, the other portion of the top edge of the same bar cannot rise high enough to reach the bell crank belonging to any other permutation bar. The top end of a lever $2^a$ has convex edges and engages in a slot $5^a$ in the adjacent edge of a slide $6^a$ parallel with its respective permutation bar and working in its own guide slots $8^a$ in the key box 46. Three of the slides $6^a$ will be actuated by each depression of a key lever 48. $9^a$ is a nose on the rear end of a slide $6^a$ to engage the respective intermediate pin $10^a$ and push it to the rear. The pins $10^a$ are described farther on.

*Intermediate pins.* (Figs. 5, 8, 47, 48, 51 and 52.)—There are as many of these pins 93 as there are slides $6^a$ less two, there being no pin 93 opposite the middle slide of each of the 9 and 11 groups. The pins 93 are carried in a flange $94^a$ depending from a plate 94 made fast by one end to an angle plate $94^b$ fast to the standard 5 while its front end is carried through a transverse slot in the standard 4 and has a plate 95 fast to it. This plate 95 is slotted vertically to receive the front ends of the pins 93 which rest upon the bottoms of the respective slots $93^a$. The actuated pins 93 must be automatically retracted and this is done by a retractor 96 wide enough to engage a block 100 fast on each pin 93 just behind the standard 4. This retractor is a bail shaped piece having a socketed foot turning loosely about a shaft 97 which has its bearings bolted on the rear face of the standard 4. The retractor is put through its retracting motion (which is to the front) by the periphery of a cam 98 fast on a shaft 99—Fig. 3—turning in pillow blocks $99^a$ on the bed plate 25. The blocks 100 are shouldered on their under side, the vertical face butting up against the plate 95 to stop the retracted pin. Seeing that the driving pulley 27 of the machine makes 500 revolutions a minute, the retractor's rate is the same and if the noses $9^a$ of the slides $6^a$ are not out of the return path of the front ends of the intermediate pins 93 in time, the latter could not be retracted. But it is practically impossible for an operator to get his fingers off the keys as smartly as the retractor's speed demands, and to meet this impossibility, there is a special provision for changing the plane of the said return path whereby the front ends of the pins 93 shall clear the noses of the slides 6ª. It is shown as consisting of a bent arm 101 and a plain crank arm 101ª both fast on the shaft 97 and—Figs. 5ª and 7ª—carrying a bail 102 pivoted on the front ends of the said two arms. The rear end of the bent arm 101 engages with a face cam on the side of the cam 98 so that when this face cam rocks the shaft 97 the top of the bail 102 (cranked by having a plate fast to its rear face) works freely between the front of the plate 95 and a guide plate 103 fast on the said plate. The top of the bail 102 is always in contact with the pins 93 when they are down on the bottom of their slots 93ª so that when that top rises, the returned pins 93 (as well as all the others) are raised above the path of the noses 9ª of the slides 6ª, this raising preceding the retraction of the pins 93. This rise of the front ends of the pins 93 does not interfere with the engagement of their opposite ends in the coördinate wheels, because there is a little clearance in the fit of these ends in the flange 94ª. To prevent the returned pins 93 rebounding to the rear from their stop plate 95, (which rebounding would put their front ends in the way of wheel pins (described farther on) then turning, and break or bend both) and to keep the said pins down on the bottoms of their slots 93ª, there is the comb spring 104 fast to the plate 94 and having its ends bent upward and bearing with a small downwardly pointing lip not upon the tops but upon the top rear corners, the lines of pressure being diagonal downward and toward the front as shown in Fig. 5ª.

*Safety device to prevent the operator overtaking the machine.* (Figs. 10 and 11.)—The object in moving the intermediate pins 93 to the rear is to make the wheel pins enter the yokes (described farther on) and the main clutch 37 is closed by the same rearward movement. But it is important that the clutch should not be closed before the object of the said pins has been accomplished. In point of fact it does not take place until a key lever 48 is close upon the end of its depression. But it is within the bounds of possibility that an operator who fingers quickly, will get a set of wheel pins actuated before the clutch 37 is properly closed, the result being that the depression of the respective key lever would not be followed by a corresponding set of perforations in the controller. The operator would not know this and would go on with his work as if there were nothing the matter. To prevent this omission there is provided the safety device shown in Figs. 10 and 11. 16ª is a lug upon the top edge of each slide 6ª. 106, 106 are a series of bars (one less than there are slides 6ª) pivoted by their rear ends at 107 in a suitable case 108 fixed to the key box 46, and arranged in three sets to correspond with the three sets of slides 6ª, each set of bars 106 being over its set of slides 6ª. The front noses 109 of these bars are pointed and the case 108 is so positioned that the row of noses 109 stands a little to the rear of the row of lugs 16ª. The bars 106 of each set can rock on their pivots 107 between two stops 110, 110, far enough to allow of the lugs 16ª of three slides 6ª (that being the number that the depression of one key 48 actuates) to enter between their parallel sides, so that when these three lugs are engaged in this way with the bars 106, each lug is holding all the bars 106 of its group tight between it and the respective stops 110, thereby preventing the depression of another key lever 48 until the three actuated slides 6ª are returned. They now stand locked—see Fig. 11—by reason of the engagement of a rack 111 carried by the bail 12ª, with a tooth 112 carried by an arm 113 pivoted at 114 on one of the bars 4ª, preferably on one occupying a middle position in the key box 46. The connection between the slides 6ª and the rack 111 is described farther on, but briefly it consists of a lug 11ª on each slide engaging the bail, and as said rack is carried by the bail the thrust of the lug on the bail will accordingly be transmitted to the rack. The prompt engagement of tooth 112 and rack 111 is secured, and that engagement maintained, by a suitable spring 115 bearing on the arm 113. The depression of a key lever 48 leaves three slides 6ª projected to the rear, in which position they remain by their own inertia until returned by the bail 12ª. But, for the time being, the bail is locked in position by the tooth 112, and these three slides must be unlocked automatically. The front ends of the respective retracted intermediate pins 93 will when they drop after the face cam 98 has cleared the piece 110, drop upon the noses 9ª of the said slides. The bail 12ª is unlocked automatically—see Figs. 5ª and 11—by a frontwardly projecting finger 121 carried by the bail 102 and which engages and rocks up the suitably shaped rear end 112ª of the arm 113 each time that the said bail rises, this unlocking being effected synchronously with the closing of the main clutch 37. But even then, so rapid is the machine, the bail 102 might leave the end 112ª before the operator had taken his finger off the key lever 48, in which case, the rack 111 would not have quite cleared the tooth 112 and consequently the three slides 6ª would be held somewhere to the rear of their normal position. To prevent this and to secure the full return of the said slides to their normal position, before the operator is ready to depress the next key lever 48, there is a bar spring 114ª fast on the rear of the key box 46 and resilient backward, a bar 115ª incorporated with the rack 111 and therefore operatively fast to the bail 12ª, a cross pin 116ª connecting the spring 114ª and the bar 115ª, and a recess 117ª in the bottom edge of the end 112ª in which the spring 114ª engages as soon as that end 112ª is lifted (thereby disengaging the tooth 112 from the rack 111), and holds it up until the release of 48 has allowed the cross pin 116ª to return to the front, which return disengages the spring 114ª from the recess 117ª and lets the slide 6ª drop. When the operator finds his key levers 48 locked against him, he unlocks them by disengaging the tooth 112 from the rack 111, the means consisting of a bar 116 fast to the arm 113 and extending for a suitable distance to the front of the pivot 114, a push key 117 having its stem 118 passing vertically downward through a socket 119 in the top of the key box 46, the bottom end of the stem 118 being supported at a suitable height above the front end of the arm 113 by a spring 120.

*Closing the clutch 37 between the main* *shaft 29 and the cam shaft 38.* (See Figs. 4ª, 11, 25, 26, 27 and 28.)—11ª is a lug on the top of each slide 6ª (all the lugs are in a transverse row) and engages the transverse bar of the bail 12ª pivoted by the rear ends of its arms inside the key box, to a pair of arms one on each side of the bank of slides 6ª and both fast upon a rock shaft 13ª turning in bearings in the key box. One end of the shaft projects beyond the key box and has fast thereon a bell crank lever 14ª. 15ª is a returning spring pulling on the bail from a fixed point fast to the key box and to the front of the bail. The top or to-be-depressed end of the lever 14ª has pivoted to it a link 122, the opposite or bottom end of which is pivotally connected to an arm 123 (kept in its normal position by a spring) that rocks in a bearing 124 fast on the bed plate 25. The outer end of the arm 123 stands under the outer end of an arm 125 having its fulcrum in the main bearing 39. 126 is a push rod pivoted by its bottom end to the outer end of the arm 125 and engaging by its top end, when it rises, with a pawl or arm 127 pivoted at 128 on the main bearing 39. 129 is a stop on the pawl 127. The pawl 41 (already mentioned) is an S-shaped piece centrally pivoted as shown by the pin, in the block 40. Its top end stands normally, *i. e.* when the cam shaft 38 is out of action, by the side of the stop 129. Therefore when 126 is raised (as it will be) by the rearward motion of the bail 12ª, the pawl 127 is rocked up high enough to carry the stop 129 above the top of the pawl 41 and the outer end 130 of the pawl 127 also from behind it. This outer end is a cam surface and also prevents the bottom end of the pawl 41 engaging with the clutch 37. The pawl 41 is engaged with the clutch 37 by a spring (not shown) in the block 40. This engagement constitutes the closing of the clutch whereupon the cam shaft 38 starts. It makes only one revolution, however—the machine cycle—because as it is completing it, the top end of the pawl 41 rides up over the cam 130, being rocked thereby on its pivot and compelled to withdraw the bottom end of it from the clutch 37, and meets the stop 129 which has been pulled down by a spring into its old position in time to stop the revolving pawl. The pawl 41 is however disengaged from the clutch 37 by the cam 130 just before the top of the pawl 41 comes up to the stop 129. The object of this is to prevent shock. The rotation of the pawl 41 is completed by the pull of a spring 131 upon a half crank 44 fast on the cam shaft 38 as shown in Figs. 3 and 25.

*Turning the coördinate wheels.* (See Figs. 3 and 8ª.)—This is done, of course, from the shaft 38, the connecting means being the arm 44 fast on the said shaft, connecting rod 132, crank arm 133 fast on the shaft 99, slot 134 in the crank arm 133, pin 135 engaging in the slot 134 and fast on an arm 136 loose on 99, link 137 and rack bar 138 engaging the peripheries of the coördinate wheels 139 (for the 6 pins), 140 (for the 9-1 pins), and 141 (for the 11-1 pins).
The advantage of driving the wheels through their peripheries positively instead of through crank pins intermediate of peripheries and centers is very great. There is much less wear, practically perfect accuracy in the turning and therefore true register between wheel pins and yoke slots. There is further no inaccuracy possible as between one wheel and another, because each receives its motion from the same source (the rack). The object of the slot 134 is to provide a lost motion which shall coincide with the time occupied by the lifting and retraction of the intermediate pins 93. There is a special device to prevent wear in any of the connected pivots, preventing the wheels being returned exactly to their normal positions. This is shown as connected to the wheel 139. It consists of a connecting rod 142 pivoted to the wheel 139 at $\frac{1}{8}$ of a circle (the turn of a wheel it will be remembered is $\frac{1}{4}$ of a circle) below the horizontal to the said wheel 139 and having its opposite end pivotally connected to a lever 143 rocking on a pin 144 fast in the rear standard 5, a spring pulling on the top of the lever 143 from a fixed point on the said standard 5, and a stop 145 likewise fast on it. So that in spite of any imperfection in the driving connections on to the wheels, their accurate return is insured (supposing that the spring 131 should fail or that some bearings are worn) once the wheel 139 has passed the dead center. In the previous patent, the coördinate wheels and their turning gear were on the outer face of the front standard. In the present invention these parts are in recesses in their respective standard.

*Setting the interponents to correspond with the coördinate wheels.* (See Figs. 1ª, 3, 5ª, 8ª, 16, 16ª, 16ᵇ and 42.)—146 is the yoke for the wheel 139; 147 that for the wheel 140; and 148 that for the wheel 141. 149, 150 and 151 are the respective wheel slots to receive the wheel pins 149ª, 150ª and 151ª. Each of these pins is as long as a wheel is thick and lies normally in a circular seating or hole alined with the respective intermediate pin. 152 is a guiding bar fast to the rear face of the standard 5 and through which the yoke tails 146ª, 147ª and 148ª reciprocate. The yoke bar of the yoke 146 is in a slot 153 in the rear face, and those of the yokes 147 and 148 in respective slots 154 and 155, in the front face of the standard 5. 156 is a stop piece let in the slot 153, to stop the upward motion of the yoke 146. This latter has a rack 157 gearing with a pinion 158 fast on a shaft 159 turning in suitable bearings in the rear face of the standard 5 and having a pinion 160 fast on it that engages with the rack 161 sliding at right angles with the shaft 159, between front and rear slots in plates 162, 162, on the outer faces of the standards 4 and 5 respectively. The yoke 147 has a rack 163 gearing with a pinion 164 fast on a shaft 165 turning in bearings on the front face of the standard 5 and having a pinion 166 on its opposite end working the rack 167 mounted in the same way as the rack 161. The yoke 148 has a rack 168 gearing with the pinion 169. 170 is a second pinion incorporated with the one 169 and both loose on a pin driven tight in the bracket bearing 171. The pinion 170 gears with the rack 172 which is mounted in the same way as the two racks 161 and 167. Each rack 161, 167 and 172 carries an angle piece 175, 176 and 177. These are interponent carriers; and 178, 179, 180, the respective interponents. 175 has a reciprocating sliding motion upon the rack 161; 176 and 177 are fast upon the racks 167 and 172, respectively. The object of this motion is described farther on.

The engagement between each interponent and its carrier is a loose one to permit of the former reciprocating vertically. The interponents must stand in line in plan because the punches 192ª (described farther on) are in line horizontally. Each interponent has a prolongation 181 that slides in a groove in each of a pair of guide bars 182, 182. One pair of guides—that for the 6-punch carrier 175—is lower than the pair for the other two slides (those of the carriers 176 and 177) because the 6-punch carrier motion overlaps the motion of the middle (next) carrier, but the motions of the two carriers (9–1 and 11–1) do not overlap each other. The guide bars 182, 182, are the top members of the striker frame 183 sliding in guides 185 in the punch frame 184 (fixed in grooves in the standards 4 and 5) that supports the majority of the punches 192ª. The whole bank of punches stand in the order, looking at them from the right of the machine, described with reference to the controller. The top and bottom bars 186, 187 of the punch frame 184, are bored to receive the whole bank of punches. 188 is the die plate screwed to the inner face of the bar 187, and 189 is a stop for the upward or return motion of the punches. 190 is a bar fast to the striker frame 183 and reciprocates in slots 191 in 184. 192, 192 are shoulders on the respective punches 192ª—one on each punch. They normally rest on the bar 190 which therefore serves to return those that the interponents have acted on. There are no interponents to drive the feed hole punches—these are driven by being made fast to the bar 190. 193 is a suitable hopper and chute to collect and deliver the paper punchings away from the machine into a suitable receptacle. The striker frame 183 is reciprocated by a link 194 and lever 195—see Fig. 25—fulcrumed on the bracket 39. This lever 195 is rocked by the single cam 42 which has a groove in its side for the purpose as shown in Figs. 16, 25 and 26.

It is of the greatest importance that the yokes 146, 147 and 148 should be locked in their normal positions so that their slots shall register with the respective rows of wheel-pins 149ª, 150ª and 151ª. There must also be a device to return the wheel pins into their seatings in the respective wheels. One device is made to discharge both functions of locking and returning. 196—Fig. 3—is a wheel pin returner. It is a flat plate sized and shaped to work freely in the respective yoke slot, as shown in Figs. 3, 5, 48, 51 and 52, the three plates all being fast on the top end of an arm 197 loose on a rock shaft 198 that rocks in bearings on the rear face of the standard 5. 199 is a crank arm fast on the shaft 198 and having a small pin to engage behind the lever 197. 200 is an arm fast on the shaft 198 and having a finger 201 standing up on the end of it in the path of the cam 43. The finger 201 is pivoted to the arm 200 for a reason which will be explained farther on. 202 is a stop on the guide 152 to prevent the returner 196 being moved too far—it should only come up flush with the standard 5—and 203 is a spring clip on the said guide 152 to prevent the lever 197 rebounding after the returner 196 has either entered a yoke slot or been pushed out of it. The returner 196 stands normally in a yoke slot. It is pushed out of it by the respective wheel pins and smartly too for it works at 500 a minute. The arm 199 has the same rate—hence the necessity of the spring clip 203 which thus acts as a brake. 204 is a spring to return the rock shaft after the cam 43 has acted on it, as shown in Fig. 3. The two, the said spring and cam, in fact hold the said shaft between them and as the lever 197 is loose on the shaft 198, the return of the shaft does not withdraw the returners 196 from the yoke slots. There is a returner 196 and its allied parts for each yoke.

If the operator is interrupted and stops his machine by the main clutch (which will stop the driving and cam shafts instantly, even if they are both clutched) he may leave wheel pins in the yoke slots and forget which character they stand for. It is true that he can look at the printed record on the ribbon, but the typewriter must be moved out of its way to expose it. The quickest way out of the difficulty is to expel the wheel pins from the yoke slots, and this is done by a key lever 205—see Fig. 3—fast on a rock shaft 206 turning in bearings 207 on the base 25, and carrying an arm 208 which the depression of the key lever 205 causes to bear on the adjacent lever 199 and rock all the three pieces 196 into the respective yoke slots. As soon as the key lever 205 is released, the spring 206ª returns it while the spring 204 returns the returners 196. A depression of the key lever 205 will also suffice to return any wheel pins which a careless or playful depression of a key lever 48 may have pushed into the yoke slots. In any case a prudent operator will always depress his key lever 205 before he begins fingering the keyboard.

*Making perforations for quad spaces to fill out a short line.* (See Figs. 1, 6, 6ª, 25, 26, 33, 35 and 36.)—The quad key lever 214 on the keyboard has a tail piece 211 fast to it and having its front end standing immediately under a lateral pin 212 fast on a special key lever (known as the zip key) 213, in order that the depression of the key 213 may include the depression of the quad key 214. The depression of the quad key 214 inserts a wheel pin in each of the slotted yokes in the same way as does the depression of a character key lever 48 and by like means. But the zip key does not. The key 213 has its fulcrum 215 in the bed plate 25. 216 is a link from the rear end of 213 to a lever 217 having its fulcrum 218 in a rock shaft turning in a bracket 219 dependent from the base 25, so as to pull the top of the lever 217 to the front. 220 is a link from the top of the lever 217 to the bottom of the finger 201 already mentioned. 221 is a stop pin up to which the returning spring 222 pulling on the link 216, keeps the top of the finger 201. 223 is an arm fast on the fulcrum or rock shaft 218 above mentioned and having its rear end standing normally under and up to—see Figs. 25 and 26—a shoulder 224 on the arm 225, the top end of which is pivotally connected to the adjacent arm of a bell crank lever 226 having its fulcrum at 227 on the main bearing 39. 228 (the point on which the returning spring of the pawl 127 pulls) is continued through the respective link 229 to stand fast above and in touch with the adjacent arm of the bell crank lever 226. The depression of the key lever 213 raises the arm 225; 225 rocks the bell crank lever 226 and (the operator keeps 213 down until the machine stops automatically at the end of the quadded line) makes the pin 228 rock up 127 to clear the S-shaped pawl 41, thereby closing the clutch. The same depression of the key lever 213 rocks the finger 201 out of the path of the cam 43, the consequence being that the three wheel pins corresponding with the quad key 214 are left in the yokes and the machine goes on making perforations until it is stopped. This stopping must be automatic because the operator is not smart enough to take his finger off the zip key 213 at the right moment—he would be too late or too early. It is effected by the key piece of the justifier (described farther on) engaging the bottom and sloped end of the arm 225 and knocking its shoulder 224 off the arm 223, whereupon the returning spring 230 returns the bell crank 226, so pulling the pin 228 from under the pawl 127.

*Preventing the zip key 213 and a character key lever 48 being depressed at the same time.* (See Figs. 25 and 26.)—This simultaneous depression might occur at the end of a paragraph that concludes with a short line, for the operator would be very likely to, especially if he were in a hurry, depress the key lever 213 before the machine had finished with the full stop that was the last character of the paragraph. The following combination is adopted to prevent the zip key 213 being depressed during a cycle started by the depression of a character key lever 48. The pawl 127—Fig. 25—has the link 229 pivotally connected to it, while the bottom end of the said link has a slot 231 standing over a pin 232 fast on a lever 233 fulcrumed at 234 and 235 is an arm on 126 engaging under the adjacent arm of lever 226. Therefore, when the depression of the key lever for the full stop just mentioned, raised 127 to clear the pawl 41, it pulled the nose of the lever 233 in front of the adjacent end of the lever 226, thereby locking the latter against the action of the zip key 213. It is the fact of the connection of the lever 233 to the pawls 127 that makes the slot 231, as distinguished from a hole, necessary to allow of the link 229 following the rise of the pawl 127 in spite of the lever 233 having locked the lever 226 in an extension of the lever 233 to bring it within the reach of the cam 236 which in due course rocks the nose of the lever 233 from before the lever 226 to free the zip key 213.

*Type writer.* (See Figs. 1$^a$, 3, 4$^a$, 8$^a$, 12, 13, 14 and 15.)—237 is the frame of the typewriter 237$^a$. The latter is mounted and operated in substantially the same way as in the previous patent. The ribbon moves through the typewriter edge up and the impression of a type reads transversely. It is necessary that the impressions should be alined in the sense of being vertically under each other. To secure this, the horizontally moving bar 238 actuated by a rack 239$^a$ on the yoke slide 147 through pinions 238$^a$, 238$^b$ on shaft 238$^c$ is notched at 239 to the same pitch as the distances of the type from center to center; and after each motion of the bar 238, the arm 240 which is fast to the shaft 240$^a$ of the type hammer 241, engages in the notch opposite to it and alines the type before the latter prints. 243 is a hole in a plate 244 extending across the frame of the typewriter, and through which the hammered type gets at the inking ribbon 242—Fig. 3. This ribbon is carried by two spools and is gradually wound off one on to the other as the typing of the record proceeds as heretofore. The winding mechanism of the present invention is an improvement on that of the previous patent and is as follows. 245 is a spring finger fast on the reciprocating slide 11 already described and engaging with a ratchet wheel 251$^a$ fast on the shaft 251$^c$ turning in bearings in blocks 251$^b$, 251$^b$ on the standard 5. 246, 246 are two worm gears of the same hand and both fast on the shaft 251$^c$. Each worm 246 gears with a worm wheel 246$^a$ fast on the shaft 248 of the respective spool 247. These two spools 247 are loose on their shafts 248, but either can be lcked thereon by the key-device 249, so that reversal is accomplished by loosening one spool and locking the other. This is much better than having to take each spool off its shaft and put it on the other. 250 is a spring brake on each spool. It is to prevent the momentum of the loose spool of the pair, forming a slack in the bight of the ribbon. The bearing blocks 251$^b$, provide bearings for the spool shafts 248 and bearing surfaces for the spools 247.

*Space key for punching a trip hole to show the presence of a space.* (See Figs. 1, 6$^a$, 7, 11$^a$, 16 and 16$^a$.)—It must be noted that the smallest type (smallest, *i. e.*, in point of set-way dimension) that the machine can be called upon to provide for, is a one unit type. Now it never punches a trip hole for a one unit type because the casting machine normally holds the mold set for this dimension. Accordingly, the 6 set-way dimension organs of the present invention stand for 2, 3, 4, 5, 6 and 7 units. Further, the depression of a space key must actuate three intermediate pins, one for each coördinate wheel because the matrix (a blank one) coöperating in the casting of a space in the casting machine, is not the central one in the matrix carrier—that one comes into action only to prevent metal getting at the matrix carrier when something has gone wrong with the casting machine—but one out of the center, and that is why two coördinate wheels must be rocked. The third must be rocked to get the two units counted by the machine. This rocking is prevented from actuating the 2 unit punch because the actuation of all the punches of the 6 series (being the justification series) belongs to the justifying process which is a subsequent one. The trip holes of the present controller are, as previously explained, near the middle of the ribbon and therefore the trip hole punch 192$^b$ is near the middle of the punch frame. 251 is the space key lever fast on a rock shaft 252 turning in a bracket bearing 253 fast on the bed plate 25. 254 is an arm fast on the shaft 252 and projects to the rear under an arm 255 fast on a shaft 256 turning in bearings in the base 25. 257 is an upstanding arm fast on the shaft 256 and pivotally connected to a link 258 which pulls on an arm 259 fast on the bottom end of an upright shaft 260 turning in a bearing in the top of the base 25 and in a second one 261 fast on the standard 4.

It must be explained how the space key lever 251 gets at the three intermediate pins. It does so by means of a pin 262 fast to it and engaging with the underlying lever 263 which ranks functionally with the character key levers 48 already described. The key box 46 is detachable from the base 25, together with all the organs connected with it and for that reason the space key 251 must be on the base 25 and the lever 263 on the key box. It is this detachability that imposes a perfectly loose connection between the space key 251 and the lever 263, and as their arcs are not coincident the connection must be a sliding one. 264 is a torsional returning spring connected to shaft 256. 265 is an arm fast on the top of 260 and connected—Figs. 1$^a$, 7 and 16—by a link 266 to the interponent 267 sliding on the striker frame. This interponent 267 stands normally over the vacant space between one group of character punches and the trip punch 192$^b$. When the space key 251 is depressed it is moved to the rear over the trip punch 192$^b$ and therefore ready to actuate it when the striker frame 183 is pulled down. But (as has been already explained) the actuation of the third coördinate wheel yoke 146 by the two unit wheel pin, would normally now work the two unit punch of the justifying series, and which working must be prevented because it is not wanted. It is prevented by a link 268 on the interponent 267, a bell crank lever 269 fulcrumed at 269ᵃ on the striker frame 183 and carrying a horizontally projecting stop lump 270, the action being that the depression of the space key lever 251 pulls 267 to the left of Fig. 16 till it stands over the trip punch 192ᵇ and rocks the lump 270 downward out of the path of the lump clearing slot 271 in the interponent 178 and into the path of the unslotted portion of the same, so that it cannot be moved to the left to stand over any of its bank of punches or even to register with the adjacent feed hole punch. The carrier 175 is connected to the respective rack 161 by a spring and slot connection that allows of the said rack moving when the interponent 178 is locked.

*The unit counting mechanism that registers and exhibits the number of units composed.* (See Figs. 1ᵃ, 3, 8, 9, 49 and 50).—There will be a standard length of line for the operator's particular job, expressible in units. The depression of each lever in the key box—*i. e.* character key levers quad and space key lever—puts so many units into the ribbon. These must be recorded in the machine to provide a basis for the justifier to work upon. The recording means are as follows. The yoke 146 receives all the units and transmits them to the recording wheel 267ᵃ by a pawl 268ᵃ pivoted on the yoke 146 at 269ᵃ. This pawl works very rapidly and to prevent it overthrowing upward (which would be to record in excess), the incline 270ᵃ on one edge of it and the shoulder 271ᵃ on the other, lock it between and against a pair of pins 272, 272, on a part 273 which is stationary as far as this locking is concerned and the special function of which is described farther on. It will be noticed that the pawl 268ᵃ must return after each transmission of units corresponding with each depression of a key lever, to the wheel, during which return it is rubbing over the periphery of the wheel 267ᵃ. The wheel 267ᵃ is turned by the pawl 268ᵃ against the resilience of a spring 276ᵃ in the wheel box—shown in Fig. 9—associated with the shaft 275 to which one end of the spring is fast, the other end being fast to the dial 276, so that the spring in the wheel box would return the wheel 267ᵃ to zero as soon as the pawl 268ᵃ had ceased locking it, if it were not for some special locking detent. This detent is a pawl 304 pivoted on the standard 5 and connected by a link 305 to the part 273. But as this part 273 only withdraws the detent 304 at the end of a line, there is a slot 305ᵃ in the link 305 which allows of the detent 304 being rocked away from the wheel 267ᵃ by the latter each time the pawl 268ᵃ is registering units. The shoulder 271ᵃ is concave to force the pawl 268ᵃ up to the wheel 267ᵃ which it stops by pressing on a beveled side of a tooth and the incline 270ᵃ is inclined in the direction shown to allow of the pawl 268ᵃ following and keeping in engagement with the wheel periphery below a horizontal diameter of it, otherwise it might leave it and thereby make the record short. 274 is a returning spring which begins to act on the pawl 268ᵃ only after the pawl's hold on the wheel has ceased and it has begun to descend. The wheel 267ᵃ is fast upon the axle 275, the latter turning in a bearing in the standard 5. 276 is a dial fast constructionally to the said standard 5. 277 is a finger fast on 275. The wheel 267ᵃ has 100 teeth. This number is an arbitrary but convenient one. The dial 276 has a corresponding scale. The record is taken from the wheel 267ᵃ farther into the machine as follows. 278 is a sector free to turn on the hub of the said wheel 267ᵃ. 279 is a circular index plate free to turn on the hub of the sector 278 but is locked to the said sector 278 by a spring controlled pawl 280 on the sector. The plate 279 has the same number of teeth as the wheel 267ᵃ and is scaled to 100. 281 is a block fast on the plate 279. 282 is a finger on an arm 283 pivoted on a stud 284 fast to the wheel 267ᵃ. 285 is a bar sliding in guiding slots in a bracket 286 and the bracket 287, both fast on the rear face of the standard 5. The bar 285 is the next member to receive the units from the wheel 267ᵃ and this is done through the sector 278 and the rack 288. 289 Fig. 8 is a second rack on the bar 285 and engaging with a pinion 290 fast on the top of a shaft 291 turning in the bracket 287 and bed plate 25. 292 is a torsion returning spring for the shaft 291, the bar 285 and the sector 278. 292ᵃ is an externally screw-threaded sleeve bored to receive and turn about the reduced adjacent end of the shaft 275 and having its own bearing in the bracket 286. 293 is a circular index plate fast on the outer end of the sleeve 292ᵃ and 294 is a spring detent for holding it in any given angular position by engaging in the respective hole in a circle of holes in 293. 295 is a nut on the sleeve 292ᵃ having an arm 296 which is connected to the wheel 267ᵃ by a pin 297, see Fig. 9, fast to the latter, see Figs. 8, 49 and 50. The outer end of the arm 283 must be connected to the outer end of the arm 296 in such a way that (*a*) the axial motion of the latter shall carry the former along with it and (*b*) that the arm 283 may be rocked away from the arm 296, *e. g.* when the finger 282, when being carried around by the wheel 267ᵃ, finds the inclined shaft block 281 in its path. Hence the forked end of the arm 283 and spring between the said forked end and the pin head on the arm 296 construction. This construction is illustrated in Fig. 3.

The maximum of the scales above mentioned—viz., 100—stands for 100 units. Suppose the length of line to be composed is 90 units, the index plate 279 is turned by hand until the pawl 280 is in the 90 notch. Then when 90 units have been counted on to the wheel 276ª, the finger 282 engages the block 281 on the sector 278 and starts the shaft 291 through the parts described. This start is accompanied by the ringing of a bell—as a matter of fact, this engagement and ringing both occur conveniently in advance of the count of the last unit of the 90 on to the wheel, say 20 units before. This advance is imposed on the machine by fixing the block 281 to the sector 20 units too soon, and this advance is a constant for the machine. It gives the compositor notice that he is 20 units from the end of the line and must stop composing soon enough to leave the justifier a margin of uncomposed units to use up in the justification process. The index 276 shows him how many units he is composing, so that he can stop when he has left the right margin. This is why the wheel 267ª does not start the shaft 291 as soon as the 90 units have been counted on to it but starts 20 units in advance. When the line is more than 100 units long, say 120, the dial 276 is set at 20, and the index plate 293 is turned outward away from the wheel 267ª through one turn (one turn=100 units) so that the finger 282 will have to travel 100+20 units before it engages the block 281—100 really because of the advance position of the block 281.

*Bell.* (See Figs. 3, 8, 37 and 38.)—A pull rod 301 is pivotally connected with the end of a lever 366 fulcrumed on the base 25 and rocked to lift the clapper 299ª by an arm 367 fast on the starting shaft 352 and acting against a returning spring 368. There is a clearance between the arm 367 and the lever 366. As soon as the clapper 299ª drops to ring the bell 299ᵇ, the spring 368 pulls the lever 366 into contact with the arm 367, this spring so acting in combination with the weight of the clapper 299ª but the spring is the important factor. The bar 285 carries a stop 298 which is engaged over the adjacent end of the bell lever 299 when it is home as shown in Fig. 3. Therefore, as soon as the bar 285 is set in motion by the sector 278, the bell clapper 299ª drops. As soon as the compositor has composed his line, he depresses the starting key 351 (so called because it starts the justifier). This depression acting through the pull rod 301 and the connections of the latter to the lever 299 reëngages the latter 299 under the spring detent 302. As the bar 285 returns, the stop 298 pushes the detent 302 off the lever 299 and practically takes its place. The end of the lever 299 is cranked to engage under 302 and have 298 engage over it.

*Return of the unit counting mechanism.* (See Figs. 2ª, 3, 7, 8, 9.)—This is effected automatically from a cam 306 on the justifier bracket. The cam 306 (being part of the justifier) turns only at or near the end of a line. 307 is a lever pivoted on the standard 4 and held in contact with the cam 306. The lever 307 is fast on the shaft 308 turning in the standards 4, 5 and on the opposite end of which the arm 273 already referred to is fast. As soon as the cam 306 starts, its major diameter depresses the adjacent end of the lever 307, thereby rocking the arm 273 away from the wheel 267ª and consequently disengaging the pawl 268ª and the detent 304 therefrom, and the parts mentioned are returned to zero by the spring in the wheel box and the spring 292. The reason why the wheel 267ª and the parts immediately connected have the special returning spring (the one in the wheel box) is the necessity of getting the said wheel back as quickly as possible because it must be back and at rest at zero before the next key lever is depressed. The other connected parts, *e. g.* the bar 285 and shaft 291 may be allowed to lag a little, but not this wheel. The shaft 275 that carries this wheel 267ª and the index finger 277 has a special stopping device to make the wheel stop dead at zero. If it did not stop at zero and dead too, there would be a looseness or play between the nose of the pawl 268ª and the radial face of a tooth which looseness would count perhaps half a unit, less or more on to the wheel 267ª. This special device consists of a spur pinion 309 fast on the shaft 275 and a second one 310, say one and a half times the size, in gear with it but loose on its own stud axle 311. There is more than the usual backlash between these two pinions 309, 310. 312 is an arm fast on the side of the pinion 309 and 313 is another arm fast on the side of the pinion 310. These two arms contact with each other—a side of the arm 312 with the outer end of arm 313—when the wheel 267ª is back at zero, the said faces being then parallel with a diameter of 309 and in the position shown in Fig. 8. As the wheel 267ª is being turned by the pawl 268ª, the arm 312 turns up and over to the left and the arm 313 in the reverse direction. The ratio of 3 to 2 provides for the two arms keeping clear of each other long enough. During the return motion of the wheel 267ª which is very rapid, the arms approach each other and just as the wheel attains zero, the arm 313 presents its contacting side anvil fashion and the arm 312 brings its contacting side down upon it, the angular relationship of pinion 310 and arm 312 being such that at the moment of contact the teeth of the two pinions are between each other—the extra backlash allowing plenty of room for this.

*The key piece of the justifier and means for working it.* (See Figs. 2, 4, 6, 21, 22, 23, 24, 43, 44, 45, 47 and 48.)—The 20 front rows $j$, $j$ of the keys of the key piece 313ª, are the same as in the previous patent, being a key for every possible combination. Each will put in a quotient which will consist of one or more remainder units. The keys in the next row $k$ are for a line that requires no justification after composition, that is, its normal spaces of two units each represented by the trip holes sufficed to justify it. The keys in the next five rows $l$ practically insert one unit spaces, and this they do by subtracting one from the normal two. Thus while the keys of the 20 rows $j$ are adders, those of the five rows $l$ are subtractors. The units are transferred from the wheel 267ª to the key piece 313ª by the crank arm 314 fast on the bottom end of the shaft 291, the series of gears 315, a rack 316, the block 317 fast on the first wheel of the said series and with which the arm 314 is in constant contact. The block 317 is adjustable to regulate the radial distance of the point at which the arm 314 contacts with it, to make the throw of the crank arm 314 make a key register with the two transferring slides. The rack 316 holds the key piece 313ª to it by a pair of studs 314ᵇ between which the key piece can slide in the direction proper for the transference of the trip holes next described, while it works between two guides 313ᵇ fast on the plate 315ª, for the transference of the units from the wheel 267ª. The plate 315ª is provided to carry the key piece 313ª and the connected parts. It is pivoted by pins 315ᵇ within a recess in the underside of the bed plate 25. The placing of the plate 315ª within a recess in the bed plate 25 is advantageous by conducing to compactness of construction, while the hinging of it to the bed plate 25 in conjunction with the hinging of the latter to the table which supports the said bed plate provides a ready access to the key piece 313ª and its connected parts.

The trip holes $b$ are transferred by the following means. It has already been explained that each trip hole $b$ is caused by a depression of the space key 251. Each of these depressions, acting—Figs. 6 and 34—through the rock shaft 252, arms 254 and 255, rock shaft 256 and the nose of the spring arm 319 carried by the said shaft downward. The nose of the arm 319 stands between two studs on the nose of the pawl 320 which is pivotally connected by its opposite end to a crank 321 fast on the constantly rotating shaft 98 so that the nose of the pawl 320 is being constantly reciprocated by the shaft 99 and will be depressed by each depression of the space key 251. The two arms 313ᵇ—Fig. 21—carrying the key plate 313ª between them are fast to the bar 332 which slides in a suitable guide to and fro upon the plate 315ª. 323 is a rack likewise free to slide in a suitable guide upon the plate 315ª, and by the side of the bar 332. There is a connection between them, which consists of a shoulder 346 on bar 332 and an overlapping stud 346ª on the rack 323. The pawl 320 is alined with and over the rack 323 as shown in Figs. 34, 47 and 48, so that each depression of the space key 251 moves the key piece 313ª for the distance of one tooth of the rack 323. This rack and its connected parts are prevented from premature return by a pawl 322 kept in engagement with the rack by a spring as shown in Fig. 22.

The rack 323 is released and the key piece 313ª locked against return to the rear (which return would be effected by a spring box 315ᶜ in the train of gears 315) and also to the right hand by the cam 306 depressing—Figs. 2ª and 4ª—through the lever 307, a vertical push rod 325 against its spring 326. The bottom end of 325 bears upon an elastic arm 327—Figs. 21 and 22—pivoted in the bracket 328. Its right and resilient end engages between two pins on a vertically sliding piece 329 which, when depressed, puts (a) the stud 330 fast on it into a notch in the series of notches 331 on the slide 332 which is part of the key-piece carrier, and (b) a pin 333 into a hole in the series of holes 334 in the rack 316. The pitches of this rack 316 and its series of holes 334 are identical with the pitch of the key-piece 313ª. The depression of 327 also bears upon a pin 335 on the tail of the detent 322 and disengages it from the rack 323 which is at once returned by its spring 324 to the stop 324ª. The locking (engagement of the stud 330 and pin 333 in their respective notch and hole) just mentioned, is maintained by the contour of the cam 306 through one rotation of the starting shaft 390ª. The rack 323 is independent of the slide 332 although they move side by side on the plate 315ª. The advantage of this is that the slide 332 being held locked by means actuated from the starting shaft 390ª, it might happen that the operator would require to depress the space key 251 next after he had depressed the starting key 351, and if the rack 323 were fast to the slide 332, it would not be able to respond to the said space key 251. It is therefore free and returnable by its spring 324 as soon as its detent 322 is disengaged from it. There is a clearance—Fig. 21—between the adjacent ends of the rack 323 and the slide 332, the rack starting first and not overtaking the slide 332 until the pawl 322 is at the third tooth of it, whereupon the corresponding travel of the key piece 313ª begins. This delay or lost motion is because justification (by any means or under any system) is impracticable with so small a number of spaces in a line as two.

*Automatic device for preventing an operator overrunning a line.* (See Figs. 6ª, 21, 40 and 41.)—Supposing a line is 120 units and the bell 299ᵇ rings at 100 units, the operator is said to overrun the line if he composes more than 120 units. He is prevented by the front end of the rack 316—Fig. 21—being prolonged far enough to the front of the machine (left hand of Fig. 21) to be made by the depression of key lever corresponding with the composition of the 120th unit, to engage the cam 336 fast on the spring returned rock shaft 337 and rock the nose of the detent 338 immediately in front of a bar 339—Fig. 6ª—pivoted by its left end to the bottom end of the bell crank lever 14ª—Fig. 4ª—which it will be remembered is rocked by the depression of each key lever for either a character or a space. The bar 339 slides in a suitable guide.

*Permissible overrunning and cut out of the automatic device just described to permit of such overrunning.* (See Figs. 6 and 21.)—It may, however, happen that the compositor finding a line ending with such a word as "thought" that cannot be divided and is also too long to be sent on to the next line, has got all in the line excepting the final "t" (a three unit letter) when the dial shows him that the preceding "h" made up the 120 units. He has only three more units to get in and the present invention offers special provision to meet this special requirement. The operator swings the switch lever 340, which carries a depending pin 341 engaging in a slot 342 in the bar 339, and this would pull the said bar 339 out of alinement with the detent 338 if it had been rocked into that position, as it is assumed that it would have been. The negative row *k* of keys—Fig. 23—in the key piece 313ª will now have passed the pair of transferring slides 407, 408, and the last five rows *l* of keys will come into operation by subtracting three units, *i. e.*, one from each of three two-unit spaces. 343 is a returning spring pulling on the lever 340 from a fixed point on the bed plate 25. The transferring slides 407, 408 just mentioned as well as the means for operating them are the same as in the previous patent and therefore form no part of the present invention.

*Automatic device for preventing overrunning the spacing or trip hole perforation key lever.* (See Figs. 6ª, 21 and 34.)—It is well known in the art that no justifying system ever requires practically more than 11 spaces to act on, to enable it to justify the line exactly. So to depress the space key lever 12 times in a line would constitute overrunning in the sense of the title of this section. The automatic device provided by the present invention, consists of the flat face of a block 344 pivoted on the end of a lever 345 fast on the space key shaft 256, and the shoulder 346 already described so positioned on the notched slide 332 that the 11th depression of the space key lever 251 puts the block 346 immediately under the face of the block 344, the two adjacent faces being at the same time in touch with each other, so that the space key lever 251 will be locked. 347 is a spring pulling on the block 344 yieldingly, so that the face of 344 shall contact fairly with that of the block 346.

*Stopping the zip key 213.* (See Figs. 6, 6ª, 21, 25 and 26.)—The beveled tail end of the arm 225—Figs. 25, 26—the shoulder 224 of which arm at that moment rests on a certain arm 223—Fig. 6—enters a hole 400 in the key piece shelf 315ª—Fig. 21. The engagement of the arm 223 with the shoulder 224 to raise the arm 225, is essential to the action of the zip key 213. The latter is stopped by disengaging the said arm 223 and shoulder 224 and it is done from the rack 316. The latter carries a pin 348 that comes up to a cam 349 on a plate 350 pivoted upon the plate 315ª as the rack 316 is moved to the front, and rocks the said plate 350 up against the beveled tail end of the arm 225, thereby knocking the shoulder 224 off the arm 223. Seeing that the rack 316 does not start until within 20 units of the end of the line, it is clear that the knocking off will not take place until the line being quadded is nearly full. There is a hole and pin device 350ª in combination with the plate 350, to prevent it being rocked too far. The said plate 350 does not require any returning spring—the arm 225 having enough.

*Starting shaft, starting key, &c.* (See Figs. 6, 6ª and 21.)—351 is the key that starts the justifying mechanism. It is fast on a rock shaft 352 turning in bearings against the pull of a returning spring 353. It is useless to start the justifier before the line is long enough to be justified and before there are spaces (trip impressions *b*) enough for the justifier to work on. The premature or mischievous depression of the key 351 is prevented by the following automatic device. 354—Fig. 21—is a slot in the shelf 315ª of the key piece and 355, a guard carried by the said key piece 313ª. (It is shown as being an extension of it.) It has an internal angle 355ª on its right hand side toward the rear because one operative motion is to the front and on the right side because its operative motion is to the left and there must be some of each motion to practically uncover the notch 354. 358 is an arm fast to the shaft 352 on the opposite side to the key 351, so that the depression of the latter rocks 358 up. 357 is a lever loosely fulcrumed on the shaft 256 between two collars fast thereon and holding a nose 356 depending from its opposite end immediately over the notch 354. The cross section of the nose 356 corresponds with the area of the notch 354. So long as this notch is not uncovered, the guard 355 locks the key 351 by standing in the downward path of the nose 356. Either a premature depression by the operator or one by someone other than the operator would be mischievous because, as the depression of the key 351 starts the justifying mechanism, the latter would get to work on the controller before a line of it was ready to be justified, the result being that the said mechanism would spoil the controller. The key piece 313$^a$ carries another automatic stop. This is on the same side of the key piece but opposite the one just described; and its object is to prevent the operator depressing the starting key 351 when he thinks he has finished the composition of a line, but has not by reason of his having omitted the (or some of the) three trip perforations $e$, or because the line, being a long polysyllable might not have a space in it. But as there must be at least three spaces to start the justifier and to furnish material for it to work on, this second stop is provided. It is positioned at the opposite end of the key piece because it cannot be required to operate before the end of the line is reached and also because it would be extraordinary if during the composition of the line there had not been some space holes $e$ made. It consists of a second guard 359 which begins to cover the notch 354 near the end of the line and holds it absolutely closed from the depression of the last character key lever 48, so that if the operator has not composed the necessary number of $e$ perforations, he will find his machine locked against his starting the justifier. But as he may have composed a few, say two, perforations $e$ during the line and wake up before he gets to the end of the line, to the fact that he has not got in the full quantity, the guard 359 is stepped in its front edge, so that a smaller number than 3 (or as small a number as 3) depressions of the space key lever 251 will suffice to make the guard 359 clear the notch 354.

There is another risk to be guarded against and that is this—in the case of a long line—say 300 units, the operator may have used up the resources of the $b$ perforation rack 323—Figs. 21, 22—and which is only equal to 11 perforations, before he comes to the known-length-of-line point, being the one at which the bell 299$^b$ rings, and which ringing would be interpreted as meaning " It is now safe to start the justifier." But until the justifier has started, the key piece 313$^a$ has not started to the front. Supposing this to be the state of things at the moment, there is a pin 360—Figs. 3, 21—on the bar 316 positioned so as to occupy the path that will be taken by the cranked nose of the bell crank 361 when the starting key 351 is depressed. The connection between the bell crank lever 361 and the starting key 351 is shown in Figs. 3 and 6$^a$, 362 being a link from the lever 361 to the crank arm 363 fast on the shaft 352 of the key 351. The lever 361 is fulcrumed on the bed plate 25. The pin 360 is wide enough to lock the lever 361 until the key piece 313$^a$ has been moved far enough to make some one transverse row of the keys register with the transferring slides.

*To prevent the space key lever shaft 256 failing to transfer the depression of the space key 251 to the rack 323.* (See Figs. 3, 6$^a$ and 46.)—A too rapid fingering of the space key 251 may cause such a failure in the following way. If the operator takes his finger off the key 251 too soon, the pawl 320 will be pulled away out of engagement with the rack 323 before the latter has been moved by it. This premature pulling away is prevented by the engagement of the bottom end of a spring finger 364 fast on the tail of the middle arm 197, over an arm 365 fast on the shaft 256 as it is rocked downward by the depression of the space key. This finger 364 is disengaged by the wheel-pin-ejecting motion of the arm 197; and as this engagement does not take place until after the pawl 320 will have moved the rack 323, the desired prevention is effected.

The justifier—(see Figs. 4$^a$, 17, 18, 18$^a$, 19 and 20) takes one revolution of the justifier shaft (which is not the same thing as one cycle of the machine) to justify a line, and during that time the keyboard must be locked out of action, or it would spoil the action of the justifier and the two concurrent actions would spoil the ribbon. The necessary locking out mechanism consists of a gravity latch 370—Fig. 4$^a$—pivoted upon the standard 4, resting normally upon a piece 371 fast to the rod 325—Figs. 2$^a$ and 4$^a$—already described, and projecting to the front between a pair of studs 372, 373—Fig. 4$^a$—on the depending crank 14$^a$ of the elbow crank 14$^a$, so that when the rod 325 is depressed by the cam 306 driven from the justifier shaft, and not from any part controlled by the keyboard, the latch 370 falling by gravity engages the bottom stud 373 and prevents the said arm being rocked to the front, and as no key lever can be depressed without such frontward rock, all the keys are locked. The top stud 372 is not operative beyond preventing the latch jumping.

*Punching the galley hole.* (See Figs. 2$^a$, 16, 17, 18, 19, 20, 25 and 26.)—The interponent 267 is first pulled to the front, to stand over the respective punch 192$^b$ by a link 266—Fig. 16—, bell crank lever 376 fulcrumed on a bracket fast on the front standard 4, a link 377, a lever 378—Fig. 2—fulcrumed on the justifier bracket 18, the outward (lefthand) nose of which lever is depressed by a cam 379 on the shaft 390ᵃ. There is a spring 378ᵃ to hold the lever 378 up to the said cam. The shaft 390ᵃ must also be turned to operate the striker frame 183. This operation is effected—Figs. 17, 18 and 20—by a second cam 381 on the same shaft and lifting the arm 127—Fig. 25—by engaging with a lever 383 fulcrumed to the justifier bracket 18 and which has its outer end connected to the said arm by a link 382. The lever 383 is kept down on the cam 381 by the spring that pulls the arm 127 down. The link 382 connects with the arm 127 by means of a pin 382ᵃ—Fig. 20—engaging in a hole 382ᵇ in the said arm—Fig. 25. The rise of 127 releases the pawl 41 which thereupon closes the clutch 37 coöperative with the shaft 38 and starts the latter. The rotation of the latter raises the arm 195 by the cam 42 and operates the striker frame through the link 194 as already described.

The unjustified controller is traversed through the justifier by the means illustrated in Figs. 17 to 20, those means being substantially identical with those of the previous patent. 405 is the traversing roller rotated by the pair of pawls 406ᵃ and 407ᵃ which are reciprocated for the purpose by a link 386 connected to a lever 385 which is rocked by a cam 384 turning with a pinion 411 on the main shaft, the lever 385 being dropped on to the cam 384 when the justifier is started. The rotation of the shaft 390ᵃ makes the top nose of the bell crank 388 pivoted on the justifier bracket 18, clear the arm 390 against the pull of the spring 389. The arm 390 is fast on the shaft 393 and is connected by a link 391 that moves without lost motion, to a detent 392. So that when the line hole feeler 392ᵃ—Figs. 17 and 18—(the stop feeler 243 of the previous patent) engages in the line hole c, the improvement works in the same way as the construction illustrated in Fig. 16 of the said patent.

The so-called justifier bracket 18 carries the justifier. This justifier consists of numerous small parts and the work of getting all these small parts in their places is a difficult one because it is a delicate one. The present invention makes this work simple by a special construction of justifier bracket and having this bracket detachable from the machine frame, in the way shown in Figs. 17 to 20. The bracket itself consists of two parallel uprights 450, 451, a horizontal and broad tie bar 452, occupying a central position between these uprights in both elevation and plan, and holding them together, and a projection 453 from the outside of the upright 451 alined with the said tie bar. Consequently the bracket 18 as a whole is open over its top, its bottom and each of its sides, thereby presenting free access from either top or bottom or front or back to its median line (represented by the bar 452 and projection 453). The bracket and its parts are detachably held to the machine frame in the following way. It has already been explained that the driving shaft 29 has its bearings in the justifier bracket 18, this shaft carrying the driving wheel 28 close to one end of it, which end (as shown in Fig. 18ᵃ) projects for some distance from the said bracket. The bracket 32ᵃ already described as fast to the machine frame carries a bearing block 486 Fig. 4ᵃ. This block receives the above mentioned end of the shaft 29, while the feet of the uprights 450, 451 rest upon the respective brackets 454, 455 fast to the machine frame, Figs. 7ᵃ and 8ᵃ, and the vertical edges of the said uprights fit up to the respective edges of the standards 4, 5, Fig. 2ᵃ. The top cap of the bearing block 456 is hinged to the bottom cap so that it can be opened to receive the shaft 29, while the standards 4, 5 carry latches 457, 458 adapted to engage the tops of the uprights 450, 451 when the bracket 18 is in working position.

I claim,

1. The combination of a plurality of pricker rollers in alinement with each other; a ribbon roller turning loosely in suitable bearings, the peripheries of both the said rollers adapted to touch and to receive the ribbon between them; and prickers projecting radially from the pricker roller and adapted to pierce the ribbon and the surface of the ribbon roller.

2. The combination of a plurality of pricker rollers in alinement with each other; a ribbon roller turning loosely in rocking bearings, the peripheries of said ribbon roller and of said pricker rollers adapted to touch and to receive the ribbon between them; prickers projecting radially from the pricker rollers and adapted to pierce the ribbon and the surface of the ribbon roller; and yielding means for holding the ribbon roller and the pricker rollers in peripheral contact.

3. The combination of a plurality of pricker rollers in alinement with each other, a ribbon roller parallel therewith, yielding means to keep the ribbon roller in peripheral contact with both the pricker rollers; prickers projecting radially from each of the pricker rollers and adapted to pierce the ribbon and the surface of the ribbon roller; and a ribbon guide in the path of the ribbon adapted to conduct it fairly between the ribbon roller and the pricker rollers.

4. The combination of a plurality of alined pricker rollers; a mechanically operated pawl common to them and adapted to rotate them; an independent detent to lock it; a mechanically reciprocated slide to coöperate with the said pawl by one motion, the other leaving it free; and manual means for then turning the pricker rollers by hand.

5. The combination of key levers, bars working in suitable guides in the key box, adapted to be raised by the depression of the respective keys, to be returned by respective springs; and carrying sets of three pins; sets of three permutation bars adapted to be raised by the rise of the respective sets of pins; sets of three slides reciprocating from front to rear in guides in the key box to engage the respective sets of three intermediate pins; and sets of three bell crank levers fulcrumed within the key box on fixed fulcra, operatively connected with the sets of three slides respectively and capable of moving them to the rear when the respective set of three permutation bars rises.

6. The combination of one shift key; slides capable of a reciprocating vertical motion in the key box, each slide carrying two sets of three pins; two series of permutation bars arranged in sets of three; operative connections between each set of permutation bars and the respective set of intermediate pins; the two sets of pins on each slide being arranged thereon each to engage its set of permutation bars and to clear the other set of pins, according to the position of the said slide.

7. The combination of key levers, slides having a reciprocating linear movement in the key box acting directly on the intermediate pins, intermediate pins sliding in suitable guides and alined with the respective slides and coördinate wheels having wheel pins with which latter the said intermediate pins can respectively engage.

8. The hereinbefore described combination of intermediate pins; slides to actuate them; coördinate wheels in which they can be engaged; an automatic retractor to retract the engaged intermediate pins; slides adapted to actuate the latter; and means for raising their front ends as they are being retracted, to clear the noses of such of the slides as may then be in an actuated position.

9. The combination of key lever, reciprocating slides in sets of three actuated thereby; a reciprocating rack adapted to be actuated in one direction by the actuated slides; and a pivoted tooth held in releasable engagement with the said rack to prevent said rack returning to the front and thereby returning the slides.

10. The combination of key lever; reciprocating slides in sets of three actuated thereby; a reciprocating rack adapted to be actuated in one direction by the actuated slides; a pivoted tooth held in releasable engagement with the said rack to prevent the rack returning to the front; a rearward projection incorporate with the pivoted tooth; and automatic means for disengaging the tooth from the rack.

11. The combination of key levers; reciprocating slides in sets of three actuated thereby; a reciprocating rack adapted to be actuated in one direction by the actuated slides; a pivoted tooth held in releasable engagement with the said rack to prevent the rack returning to the front; a rearward projection incorporate with the pivoted tooth; automatic means for disengaging the tooth from the rack by raising the rearward projection; a spring support adapted to engage under the raised rearward projection; a spring adapted to return the rack to its normal position; and a pin incorporate with the said rack and adapted to disengage the spring support from the raised rearward projection.

12. The combination of key levers; slides having a reciprocating linear movement in the key box and acting directly on the intermediate pins; intermediate pins sliding in suitable guides alined with the respective slides; coördinate wheels; a reciprocating rack meshing with the peripheries of the said wheels to drive them; and means for reciprocating the rack.

13. The combination of key levers; slides having a reciprocating linear movement in the key box and acting directly on the intermediate pins; intermediate pins sliding in suitable guides alined with the respective slides; coördinate wheels; a reciprocating rack meshing with the peripheries of the said wheels to drive them; means for reciprocating the rack, and means for insuring the accurate return of the said wheels to their normal position.

14. The combination of key box containing key levers and slides, the noses of the latter projecting beyond the rear of the key box only far enough to be capable of reaching the intermediate pins, front and rear standards parallel with each other; coördinate wheels and their turning gear working in recesses in the respective standard; intermediate pins supported by the front standard and a flange supported between the two standards and normally projecting just to the front of the front standard in the path of the noses of the said slides.

15. In composing machines of the type described, the combination with the slotted yokes adapted to receive wheel pins in their slots, of wheel pin returners adapted to drive the actuated wheel pins out of the yokes and in so doing to enter the slots in said yokes so as to lock the yokes in their normal positions by standing in the respective yoke slots.

16. The combination of punches, a shoulder on each punch, the shoulders normally alined with each other and a reciprocating striker frame having a bar adapted to directly engage the shoulders on the punches and to descend with the depressed punch so as to remain in contact with same so that on raising the striker frame said bar will at once raise the depressed punch.

17. The combination of a key lever; the slotted yokes; the wheel pin returners; the arm and lever operatively connecting the said key lever to enable the depression of the latter to make the wheel pin returners eject wheel pins from the slotted yokes; and a spring to hold the returners in the said yokes.

18. The hereinbefore described combination of quad key lever; corresponding wheel pins; slotted yokes into which the said pins are pushed by the depression of the quad key; wheel pin returners; zip key; connection between the said keys making the depression of the zip key depress the quad key; connection between the zip key and the driving clutch to close it and to put the wheel pin returners out of action.

19. The hereinbefore described combination of justifier key piece; means for actuating it; driving clutch; wheel pin returners; means for closing the driving clutch and putting the wheel pin returners out of action; and means enabling the justifier key piece to open the said clutch and put the wheel pin returners into action.

20. The combination of a character key lever; a pawl normally holding the driving clutch open; means by which the depression of the character key lever closes the said clutch; a zip key capable of being depressed simultaneously with the character key lever; a connection between the zip key and the said clutch whereby the depression of the said key closes the latter; and means by which the simultaneous depression of the zip key and the character key locks the said connection between the zip key and the driving clutch.

21. The combination of a base, a key box and its connected organs detachable therefrom; a space key lever pivoted on the base, a lever pivoted in the key box; intermediate pins; and a sliding connection between the space key lever and the last mentioned lever by which the depression of the former actuates the respective intermediate pins.

22. The combination of a space key lever; three coöperating coördinate wheels, wheel pins and yokes; means by which the depression of the space key lever engages the respective wheel pins with the yoke; a two unit punch and means for actuating it; a trip punch and connections between the space key lever and it by which the depression of the said space key lever actuates the trip punch and means connected positively with the trip punch selecting means adapted to lock the means for selecting the two-unit punch out of action.

23. The combination of a fixed dial; an index finger and a ratchet wheel turning together; a reciprocating pawl to turn the ratchet wheel according to the units composed; a sector 278 turning freely on the hub of the ratchet wheel; an index plate 279 turning freely on the hub of the sector; a pawl adapted to lock the sector 278 to the plate 279; a block 281 fast on the plate 279; a finger 282 pivoted on the ratchet wheel 267$^a$; a sliding bar 285 having a rack with which the sector 278 engages; justifying mechanism in the base of the machine and means by which the said bar transmits the units which it has received from the ratchet wheel to the said mechanism.

24. The hereinbefore described combination of a fixed dial, an index finger and a ratchet wheel turning together in connection with the said dial; an externally screw-threaded sleeve turning about the same axis as the said index finger and ratchet wheel; a circular index plate fast to the said sleeve; means for locking the said index plate in any desired angular position; a nut turning on the said sleeve; an arm fast to and projecting radially from the said nut, a pin fast to the ratchet wheel and passing through the said arm; a sector 278 turning freely on the hub of the ratchet wheel; and an arm 283 pivoted upon the ratchet wheel by one end and loosely connected by the other to the arm projecting radially from the nut.

25. The combination with the starting key lever; a starting shaft actuated thereby; bell; and bell clapper; of an arm on said starting shaft; means for operatively connecting said arm with the clapper to cause the depression of the said key lever to raise the bell clapper into operative position with reference to its bell, and a returning spring acting on said connecting means in opposition to said arm.

26. The combination with the justifier and unit counting mechanism, of a ratchet wheel; a reciprocating pawl actuating the said wheel to record the units composed; a detent to lock the said wheel after each actuation of it by its pawl; and a rocking arm having both the said pawl and a detent connected to it; a cam and means whereby the said cam rocks the said pawl and detent away from the said ratchet wheel.

27. In the justifier of a composing machine, a key piece carrying keys and means for moving said key piece bodily together with its keys at every justifying motion; said key piece comprising a series of keys one for every possible combination, a series of keys for a line that requires no justification and is adapted to record two units in the ribbon, and a series of keys for modifying the action of the last mentioned series.

28. In the justifier of a composing mechanism, the combination of a key piece carrying keys and means for moving said key piece bodily together with its keys at every justifying motion; said keys comprising a series of unit-adding keys, one for every possible combination, a second series of keys adapted to record two units on the ribbon, and a third series of subtracting keys adapted to subtract one unit from each two units that the last mentioned series of keys is normally adding to the ribbon.

29. The combination with the key piece of the justifier of a composing machine, of means for transferring the composed units to it and consisting of a ratchet wheel; a rack worked by it; a vertical shaft rotated from the rack; a crank arm on the vertical shaft; a train of gears; a block on the said train in the path of the crank arm and adjustable radially; a rack connected to the key piece and engaged by the train of gears; and fixed guides for the key piece to work between.

30. The combination with the space key and the key piece of the justifier of a composing machine, of a rack connected with the key piece; a constantly reciprocated pawl alined with the said rack; a spring arm loosely engaged with the said pawl and depressed by each impression of the space key; a detent pawl to prevent premature return of the rack; and means for effecting the return of the rack.

31. The combination with the character keys, the space key and the key piece of the justifier of a composing machine; of an automatic device for preventing an operator overrunning a line, consisting of a bar adapted by being connected to each key for either character or space to be moved by each key depression; a prolongation moving with the key piece; a pivoted cam standing in the path of the said prolongation; a detent fast to the said cam and adapted to be rocked into the path of the said bar by each engagement of the prolongation with the cam; and means for returning the bar and cam.

32. The combination with the key piece of the justifier of a composing machine, of a bar adapted by being connected to each key for either character or space, to be moved by each key depression; a prolongation moving with the key piece; a pivoted cam standing in the path of the said prolongation; a detent fast to the said cam and adapted to be rocked into the path of the said bar by each engagement of the prolongation with the cam; automatic means for returning the bar and cam; and means under the control of the operator for moving the bar out of alinement with the detent.

33. The combination with the space key and the key piece of the justifier of a composing machine, of a sliding rack connected with the key piece, means actuated by the space key for imparting a step by step motion to the said rack and key piece according to the depressions of the space key; a block carried by the rack in a definite position upon it and a block connected with the space key and placed by a certain depression of it in contact with the last mentioned block to prevent further depressions of the space key.

34. In justifying mechanism for a composing machine, the combination of a key piece carrying the keys whereby the justifying is effected; means for actuating said key piece to bring same into its operative positions; a plate carrying said key piece and its connected actuating parts; a bed plate having a recess in its under side; means for hinging the aforesaid plate to the bed plate; a table; and means for hinging the bed plate to the table.

35. The combination with the zip key and the key piece of the justifier of a composing machine, of a connection between the zip key and the main clutch consisting of a swinging arm having a shoulder and a second arm engaging with the said shoulder to raise the swinging arm, of a sliding member moving with the key piece and carrying a pin; a cam pivoted on a stationary pivot within reach of the swinging arm and with which cam the pin engages at a definite point in its travel, to push the shoulder of the swinging arm off the above mentioned second arm.

36. The combination with the starting key and the key piece of the justifier of a composing machine, of a stationary notch; a guard plate connected with the said key piece and having motions at right angles with each other and either of which uncovers the slot; a lever nose connected with the starting key and adapted to enter the notch when the said key is depressed; means for imparting the said motions to the guard plate; and means for returning the starting key and the lever nose connected with it.

37. The combination with the starting key and the key piece of the justifier of a composing machine, of a stationary notch; a guard plate connected with the said key piece and having a stepped operative edge adapted to begin to cover the notch as the end of the line of composition is neared; a lever nose connected with the starting key and adapted to enter the notch when the said key is depressed; means for moving the said guard plate up to and over the notch; and means for returning the starting key and the lever nose connected with it.

38. The combination with the starting key and the key piece of the justifier of a composing machine, of a pin moving with the key piece; a bell crank lever in the path of the said pin and fulcrumed in the base plate of the machine; and a connection between the said lever and the starting key adapted to rock the operative nose of the lever down into the path of the said pin.

39. The combination with the space key, and the wheel pin ejecting mechanism of a composing machine, of an arm connected to the space key and adapted to be rocked downward by each depression of the said key; a detent carried by the wheel pin ejecting mechanism that is moved into the return path of the said arm also by the depression of the space key and means for disengaging the detent from the said arm by the next actuation of the wheel pin ejecting mechanism.

40. The combination with the key board and justifier of a composing machine, of means for locking the keyboard out of action during justification, comprising an arm rocked to the front by each depression of any key lever on the key board; a stud on said arm; a latch adapted to engage with and lock the said stud; and means actuated by the justifier to control the action of the latch by causing same to assume a stud-locking or releasing position.

41. The combination with a galley punch, a striker frame and means therein for operating said punch, of means for controlling said striker frame, comprising a shaft, a cam 381 thereon, a link 382, lever 383 and lever 127 that closes the main clutch, adapted to hold the said clutch open.

It witness whereof I have hereunto set my hand in the presence of two witnesses.

WOOLMAN GIBSON WHITE.

Witnesses:
JOHN B. DAISH,
EDW. B. KIMBALL.